United States Patent [19]

Savanyo et al.

[11] Patent Number: 5,612,866
[45] Date of Patent: Mar. 18, 1997

[54] CODE GENERATION SYSTEM TO CONSTRUCT AN ASYNCHRONOUS REAL-TIME CONTROLLER FOR A REAL-TIME SYSTEM

[75] Inventors: John Savanyo, Fremont; Saumil S. Shah, Santa Clara, both of Calif.

[73] Assignee: Integrated Systems, Inc., Santa Clara, Calif.

[21] Appl. No.: 265,389

[22] Filed: Jun. 24, 1994

[51] Int. Cl.⁶ .................................................. G05B 19/42
[52] U.S. Cl. ........................ 364/191; 395/733; 395/557
[58] Field of Search ..................................... 364/188, 191, 364/131, 132; 395/700, 550, 737, 733, 738

[56] References Cited

U.S. PATENT DOCUMENTS

| | | | |
|---|---|---|---|
| 4,796,179 | 1/1989 | Lehman et al. | 364/300 |
| 4,839,800 | 6/1989 | Barlow et al. | 395/737 |
| 5,092,780 | 3/1992 | Vlach | 434/433 |
| 5,133,045 | 7/1992 | Gaither | 395/51 |
| 5,287,511 | 2/1994 | Robinson et al. | 395/700 |
| 5,339,419 | 8/1994 | Chan et al. | 395/700 |
| 5,481,716 | 1/1996 | Morshedi et al. | 395/700 |
| 5,513,349 | 4/1996 | Horiguchi et al. | 395/650 |
| 5,546,507 | 8/1996 | Staub | 395/76 |

*Primary Examiner*—Roy N. Envall, Jr.
*Assistant Examiner*—Brian C. Oakes
*Attorney, Agent, or Firm*—Flehr, Hohbach, Test, Albritton & Herbert

[57] ABSTRACT

A code generation system to construct an asynchronous real-time controller for a real-time system with asynchronous subsystems is described. The system includes a software user interface to specify a functional description of a real-time system with asynchronous subsystems. The software user interface includes code construction elements selected from a functional library with a corresponding menu. The menu includes a start-up procedure selection option used to initialize parameters associated with the real-time system, a background procedure selection option to specify a control action to be executed in relation to the real-time system, and an interrupt procedure selection option to specify an operation to be performed in response to an asynchronous interrupt signal. Each of the selection options include a variable block definition tool to read and write values to global variables. The system also includes an automatic code generator that relies upon the code construction elements to generate an asynchronous real-time controller. The asynchronous real-time controller includes a start-up procedure that initializes parameters associated with the real-time system, an interrupt procedure that specifies an operation to be performed in response to an asynchronous interrupt signal from the real-time system, and a background procedure that continuously loops through a set of instructions and periodically generates a control action instruction, derived from the interrupt procedure, to be executed by the real-time system.

12 Claims, 21 Drawing Sheets

CODE GENERATION SYSTEM TO CONSTRUCT AN ASYNCHRONOUS REAL-TIME CONTROLLER FOR A REAL-TIME SYSTEM

BRIEF DESCRIPTION OF THE INVENTION

This invention relates generally to controllers for real-time systems that include asynchronous subsystems. This invention more particularly relates to a computer system for automatically generating a controller that processes asynchronous interrupts associated with a real-time system.

BACKGROUND OF THE INVENTION

The use of computer software to automatically generate computer programs for performing a prescribed process is often called automatic code generation. Automatic code generators have two main advantages. First, they eliminate the need for the user to know the details of the computer language in which the code is written. Next, they generate reliable code without errors.

The present invention is specifically directed at generating computer software for complex real-time control systems, and particularly multi-rate systems. multi-rate system is a system which needs to simultaneously perform at least two (and typically a multiplicity of) tasks at different rates. The tasks to be performed will frequently include asynchronous events that should be triggered and executed in an asynchronous manner. As will be more fully described below, prior art automatic code generators result in software controllers that do not execute asynchronous events in an asynchronous manner. Instead, these software controllers execute asynchronous events according to a synchronous schedule. It would be highly desirable to provide a method and apparatus for constructing a software controller that executes asynchronous events in an asynchronous manner, thereby obviating the need to synchronously schedule such events.

FIG. 1 shows a prior art apparatus corresponding to U.S. Pat. No. 4,796,179 (the '179 patent), which is assigned to the assignee of the present invention, and which is expressly incorporated by reference herein. Specifically, FIG. 1 depicts a controlled multi-rate real-time system 20 that generates measurement and feedback signals that are applied to a multi-rate digital real-time controller 22. The multi-rate digital real-time controller 22 may be implemented in the form of a general purpose computer that includes standard interface devices for communicating with the multi-rate real-time system 20. The controller 22 executes control software 24. Execution of the control software 24 by the controller 22 results in control signals that are communicated back to the multi-rate digital real-time system 20. The general interactions between a multi-rate real-time system 20 and a multi-rate digital real-time controller 22 are known in the art. Similarly, execution of control software 24 on a real-time controller 22 is known in the art. Attention presently turns to the code generation system 26 disclosed in accordance with the '179 patent.

The code generation system 26 is a general purpose computer (not shown) that executes various software modules, including a software interface 28, which is used to generate a functional description 30 of the multi-rate real-time system 20. Specifically, a human operator interacts with the software interface 28 to create a functional description 30 of the multi-rate real-time system 20. The code generation system's general purpose computer stores the functional description 30, functional library 32 and an automatic code generator 34. In addition, a general purpose computer may be used as the multi-rate digital real-time controller 22.

Instead of relying upon a conventional computer language to functionally describe the controlled multi-rate real-time system 20, the preferred embodiment in the '179 patent, and the present application, is to rely upon functional diagrams that use logic and circuit-like functional elements to describe the relationship between the system's input signals and its output signals. The functional description 30 is obtained by selecting functional elements from a functional library 32 using a software interface 28. Each functional element performs a selected function. FIG. 2 depicts a functional block description for a missile roll control system. The depicted graphic representation has a corresponding data base representation which is described in detail in the '179 patent.

The diagram in FIG. 2 includes three large blocks 36, 38, and 40, called superblocks. Superblocks are used to organize complicated computations into manageable segments. Each superblock 36, 38, and 40 contains one or more descriptive blocks which can be either functional blocks such as the GAIN block 42, or other superblocks such as the ROLL superblock 38 inside the CONTRL superblock 36. All the superblocks except for the main superblock (CONTRL in this example) are used to specify sets of functional blocks for use elsewhere in the functional description.

For each superblock there is specified a timing or sampling interval and a skew (noted as "1st Sample" in FIG. 2). The timing interval specifies both the rate at which the inputs and outputs to the superblock are updated and the rate at which the computations for the functional blocks in the superblock are repeated. The skew specifies the delay before the first sample and first computation cycle for the superblock.

The functional blocks in the library 32 each define a software template for generating a set of software statements. These software statements perform the functional blocks' computations when the control software is executed.

The functional description 30 of the controlled multi-rate real-time system 20 is processed by the automatic code generator 34 which includes an analyzer 44 and a code generator 46. The operation of the automatic code generator 34 is disclosed in relation to FIG. 3. As illustrated in the figure, the functional description 28 is conveyed to the analyzer 44. The first step performed by the analyzer 44 is to generate data structures which represent the flow of data between functional blocks (block 50). Appropriate data structures are described in detail in the '179 patent. Next, the functional blocks are organized into subsystems (block 52). Each subsystem includes all the computations to be performed at a particular sample rate and skew, or in the case of asynchronous events, which are triggered by the same trigger condition. The analyzer 32 then links signals flowing between subsystems and links signals flowing between blocks within each subsystem (block 54). The final step performed by the analyzer 32 is to determine the order of computations within each subsystem (block 56).

Data structures including the information generated by the analyzer 44 are then processed by the code generator 46. The first step associated with the code generator 46 is to relink subsystems (block 58). This step maps out the space needed for each subsystem to communicate with a software bus. The software bus interconnects the control software's subsystems. The software bus is a buffer or data structure through which all data transfers are passed. For instance, if a second subsystem needs certain predefined data from a first subsystem, the data is copied from a portion of the software bus used to hold the first subsystems's outputs to a portion of the bus used as an input buffer to the second subsystem. The relinking step (block 58) also generates data structures which are used by the code generator 44 to determine which signals need to be copied into the sample and hold buffers of the various subsystems. At the beginning of each subsystem's computation cycle all the inputs to that subsystem from other subsystems are "sampled and held", i.e. copied into a buffer. This ensures that these input values do not fluctuate during the time it takes to perform the subsystem's calculations.

FIG. 4 depicts a sample and hold buffer 62 and its relationship to a superblock 64 including sub-blocks 66, 68, and 70. The output of the superblock 64 is conveyed to a zero order hold buffer 72. A zero order hold buffer is a device (i.e., a software technique) used to insure that the outputs from each subsystem are passed to other subsystems only after all the computations for a particular computation cycle are complete. In other words, the zero order hold buffer ensures that all the outputs from a subsystem are internally consistent and not in a state of flux. Thus, the zero order hold buffer makes the outputs of each subsystem piecewise constant—all of the subsystem's outputs change simultaneously and change only at predefined times. The problem with prior art systems that rely upon zero order hold techniques is that intermediate system values, say the outputs of block 68, are not available until all the processing associated with the superblock 64 is completed. Thus, in this scheme, an asynchronous function can only be handled after the zero order hold buffer has received its values. This only occurs after all processing associated with the functional superblock 64 is completed. As a result, the asynchronous event is effectively a scheduled event that is executed only after the predetermined period of time associated with the completion of some other functional operation.

Thus, to handle asynchronous events in a truly asynchronous manner, it is necessary to utilize intermediate system values and eliminate buffer latency delays. Therefore, it would be highly desirable to provide a methodology for exploiting intermediate system values so as to allow asynchronous execution of asynchronous events. Such a system should also eliminate buffer latency delays.

Returning to FIG. 3, after the subsystems are relinked, code is generated (block 60). That is, the code generator uses the previously generated data structures to generate a set of software modules which together comprise the control software 24.

The foregoing process is further described in relation to FIG. 5. FIG. 5 illustrates the software modules and the corresponding data structure outputs associated with the processing of prior art code generation systems. As previously indicated, the software interface 30 is the software that is used to author a functional description of a system. The output of the software interface 30 constitutes the previously described functional description 28 of the controlled multi-rate real-time system 20. As previously described, the functional description is then processed by the analyzer 44 which yields a linked database of functional operations organized into subsystems 80. The code generator 46 includes a subsystem relinker 82 performing the function described in relation to block 58 in FIG. 3. This results in the previously described software bus 90. Subsequently, a control software generator 84 is invoked to execute the function associated with block 60 of FIG. 3. These operations result in the control software 24.

As shown in FIG. 5, the control software 24 includes an initializer 94 for declaring and initializing software elements. The program also includes a scheduler 96 which constitutes the main body of the program. In the course of the scheduler's 96 operation, subsystems are called, as indicated by blocks 98 and 100. The scheduler also invokes an error handler 102. Data communication in the control software 24 is handled over the software bus 90.

The foregoing description provides a general overview of automatic code generation techniques for a controlled multi-rate real-time system. Specific details associated with the operation of the system are available in the '179 patent. Attention presently turns to how the system of the '179 patent would handle asynchronous functions or events. As used herein, asynchronous functions, also called trigger tasks or trigger events, are non-periodic events that are initiated when a trigger condition is satisfied.

In reference to triggered tasks, the '179 patent, at column 40 teaches the following: "While trigger tasks have been discussed above, the preferred embodiment does not handle trigger tasks. However, the addition of trigger tasks to the preferred embodiment would be done as follows. First, superblocks would be flagged as using either a trigger condition or a periodic computation rate. The sample period parameter would still be specified to indicate the priority that should be given to the subsystem task incorporating the superblocks using the trigger condition. The skew parameter would be used to specify the trigger condition for the subsystem by providing an index into a library of available trigger conditions. The main other change needed would be to upgrade the scheduler to test for trigger conditions and to initiate the execution of triggered subsystem tasks. The Start_Table mechanism could be expanded, or a separate array for triggered subsystems could be provided, to indicate when triggered subsystems are to begin execution."

The processing methodology associated with such a system is depicted in FIG. 6. FIG. 6 depicts the sequence of operations executed by control software constructed in accordance with the prior art. The first step associated with the control software 24 is to initialize the system (block 110). This step is performed by the main/initializer 94 shown in FIG. 5. Thereafter, discrete functions or tasks are scheduled (block 112) by the scheduler 96 shown in FIG. 5. The scheduling of discrete tasks is coordinated in conjunction with a timer interrupt. The timer interrupt establishes a time base for scheduling tasks. For example, assume that the timer interrupt is set at a 1 ms (millisecond) cycle. In this case, a 4 ms periodic event (block 114) will be executed after 4 timer interrupts.

FIG. 6 also shows functional block 116 which is a 10 ms "enabled" functional block. This means that the function of the block is executed every 10 ms if an enable signal from another functional block is provided. FIG. 6 also shows a periodic function that is executed every 15 ms. Scheduling periodic discrete functions is a relatively straight forward process.

Efficient processing of a triggered task is more difficult. The triggered task must be scheduled for performance. Thus, as indicated in FIG. 6, when a triggering event occurs, a request for scheduling is made to the scheduler. The triggered or asynchronous event is then processed according to a schedule. A determination as to when to process an asynchronous event may be assisted by associating a triggered function with a priority. The priority may be established through an assigned periodic value. For example, a triggered function may be given a period parameter of 3 ms, in which case the scheduler would execute the function as if it were a periodic function to be performed after three timer interrupts. Another way of looking at a triggered function is to view it as an enabled function. In other words, the triggering condition is equivalent to an enable signal. Thereafter, the period value is used to schedule when the function is executed. In either event, the triggered or asynchronous event is not handled in an asynchronous fashion. That is, the asynchronous event is merely scheduled and executed as any other periodic event. It would be highly desirable to execute asynchronous functions in an asynchronous manner.

SUMMARY OF THE INVENTION

The invention is a code generation system to construct an asynchronous real-time controller for a real-time system with asynchronous subsystems. The system includes a software user interface to specify a functional description of a real-time system with asynchronous subsystems. The software user interface includes code construction elements selected from a functional library with a corresponding menu. The menu includes a start-up procedure selection option used to initialize parameters associated with the real-time system, a background procedure selection option to specify a control action to be executed in relation to the real-time system, and an interrupt procedure selection option to specify an operation to be performed in response to an asynchronous interrupt signal. Each of the selection options includes a variable block definition tool to read and write values to global variables. The system also includes an automatic code generator that relies upon the code construction elements to generate an asynchronous real-time controller. The asynchronous real-time controller includes a start-up procedure that initializes parameters associated with the real-time system, an interrupt procedure that specifies an operation to be performed in response to an asynchronous interrupt signal from the real-time system, and a background procedure that continuously loops through a set of instructions and periodically generates a control action instruction, derived from the interrupt procedure, to be executed by the real-time system.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
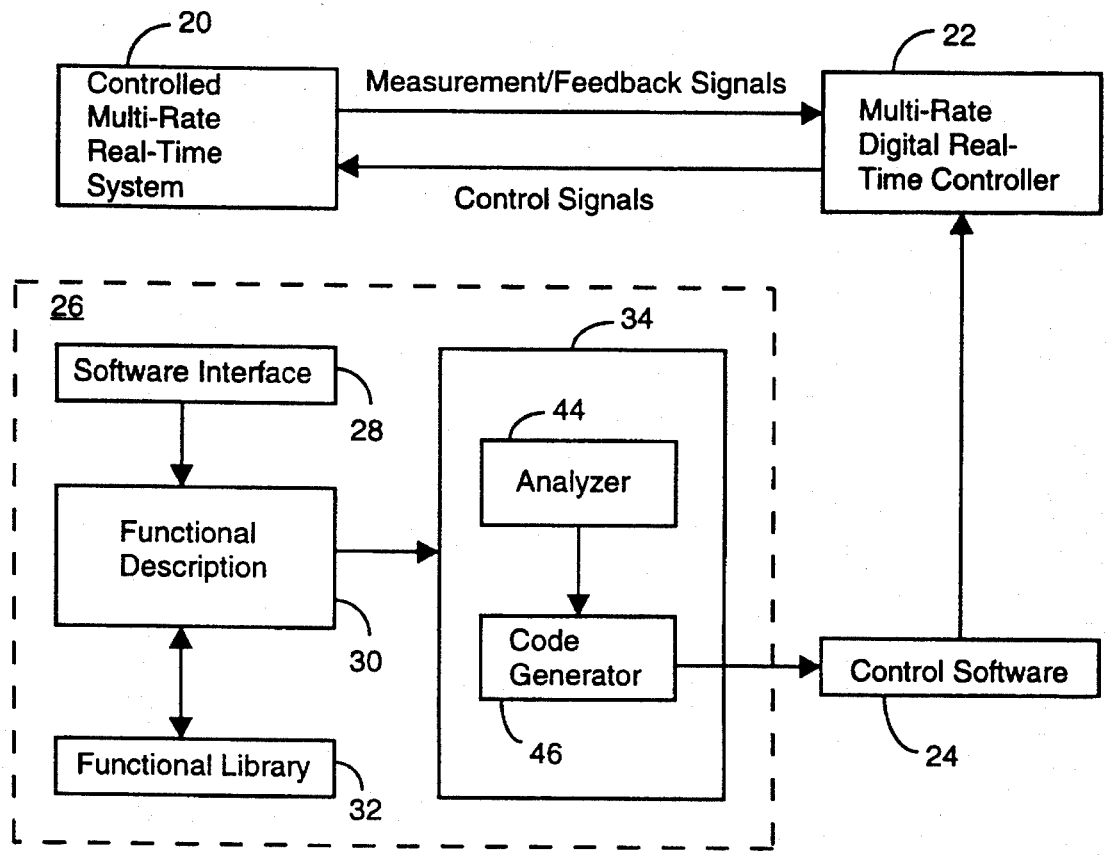
FIG. 1 is a prior art system for generating control software for monitoring a multi-rate real-time system.
Figure 2:
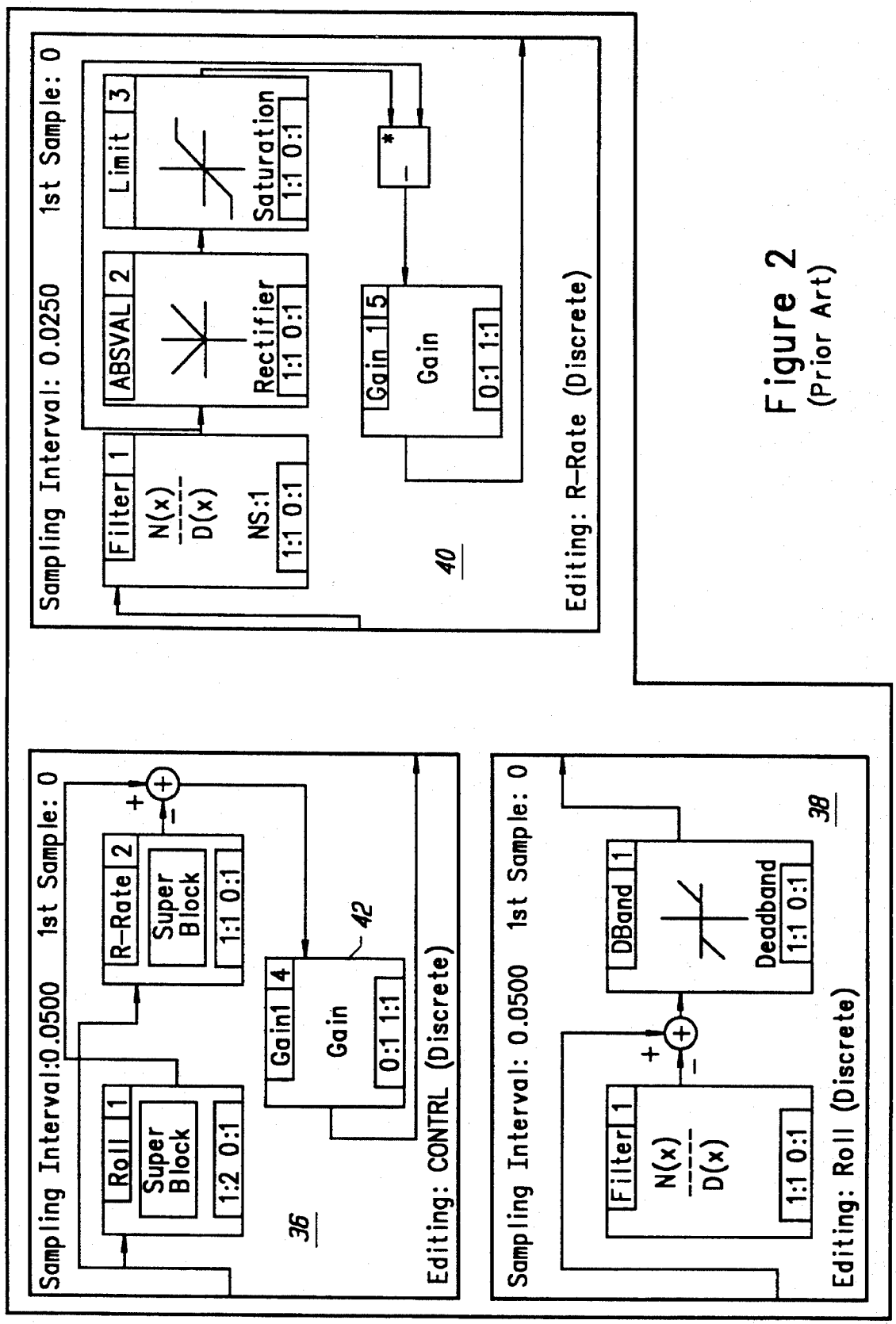
FIG. 2 is an example of a prior art functional description of a multi-rate real-time system.
Figure 7:
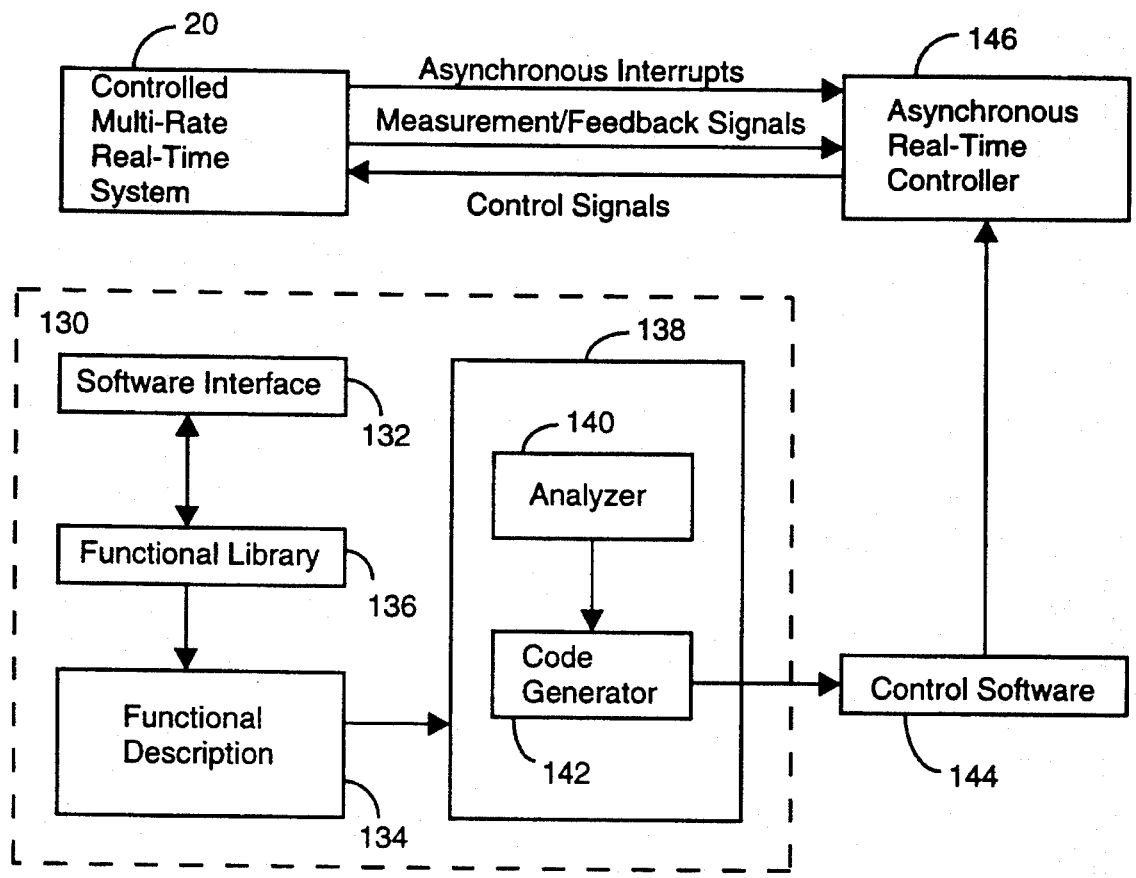
FIG. 7 illustrates the apparatus of the invention that is used to generate an asynchronous real-time controller for monitoring a controlled real-time system.

The present invention is generally disclosed in relation to FIG. 7. In brief, the present invention is an improvement over the system of FIG. 1. Specifically, the present invention is directed toward improving the system of FIG. 1 so that it can handle asynchronous events of a controlled multi-rate real-time system 20 in a truly asynchronous manner. FIG. 7 illustrates asynchronous interrupts from the real-time system 20 being conveyed to an asynchronous real-time controller 146 constructed in accordance with the present invention.

The code generation system 130 of the invention includes a software interface 132 which is capable of producing a functional description 134 of a real-time system 20. The software interface 132 accesses a functional library 136 that includes novel "start-up", "background", and "interrupt" procedure superblocks, which rely upon "read" and "write" "global variable blocks" that enable the asynchronous task-handling of the invention.

The novel procedure superblocks of the invention serve as stand-alone functions; in other words, they are treated as individual subsystems. The procedure superblocks of the invention do not have external inputs or outputs. They only interact with other system elements through the read and write global variable blocks. In accordance with the invention, the operating system holds additional interrupts when a read or write operation is being performed on a global variable. This operation insures that accurate global variable values are achieved.

The start-up procedure superblock is used to initialize variables. The background procedure is a set of computations that are performed when the system is otherwise idle. The interrupt procedure defines computations that are performed in response to a system interrupt signal. In the presence of a system interrupt signal, an asynchronous interrupt service routine is executed in a real-time environment.

The procedural superblocks of the invention do not have an assigned sample period parameter. While a software scheduler tests conditions for other superblocks and schedules the execution of other superblocks, the procedural superblocks of the present invention are not tested or scheduled by the scheduler. Instead, their operation is initiated by a trigger condition and their execution is achieved in an asynchronous manner.

The procedure superblocks and variable blocks of the invention will be further described below. At this time, one merely needs to recognize that these elements may be selected from the functional library 136, using the software interface 132. These elements are then used to produce a functional description 134 of a real-time system 20 that can asynchronously process asynchronous events associated with the real-time system 20. The functional description 134 of the real-time system is conveyed to a novel code generator 138 which includes an analyzer 140 and code generator construction unit 142. The code generator 138 generally corresponds to the prior art code generator described in the background section, but is modified, in a manner which will be described below, to handle asynchronous events. The code generator construction unit 142 produces control software 144 which runs on the asynchronous real-time controller 146.

Figure 6:
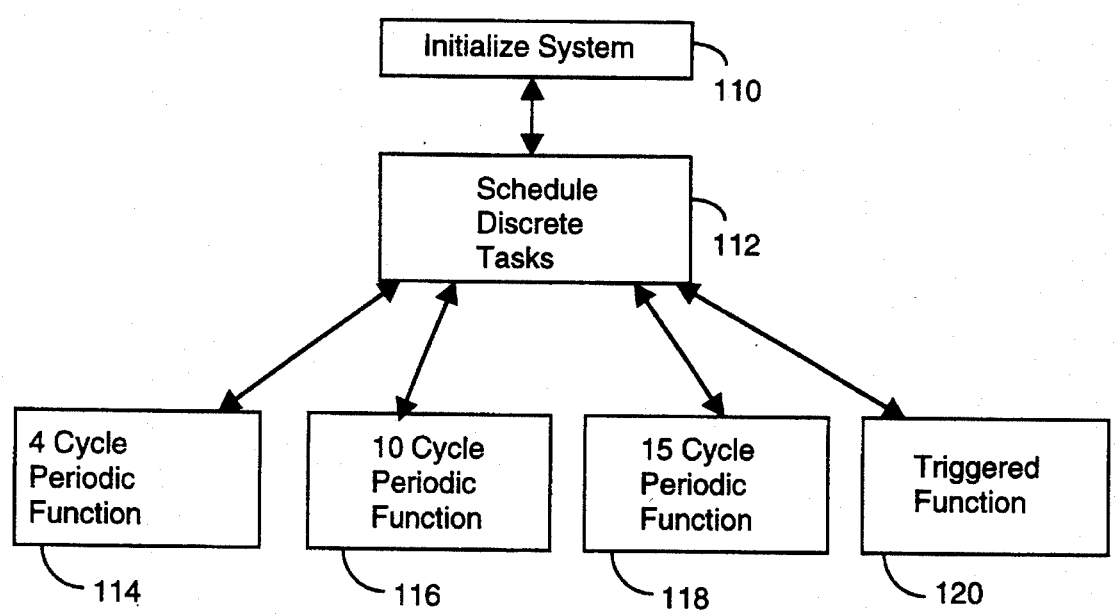
FIG. 6 depicts the manner in which prior art control software handles different synchronous functions.
Figure 8:
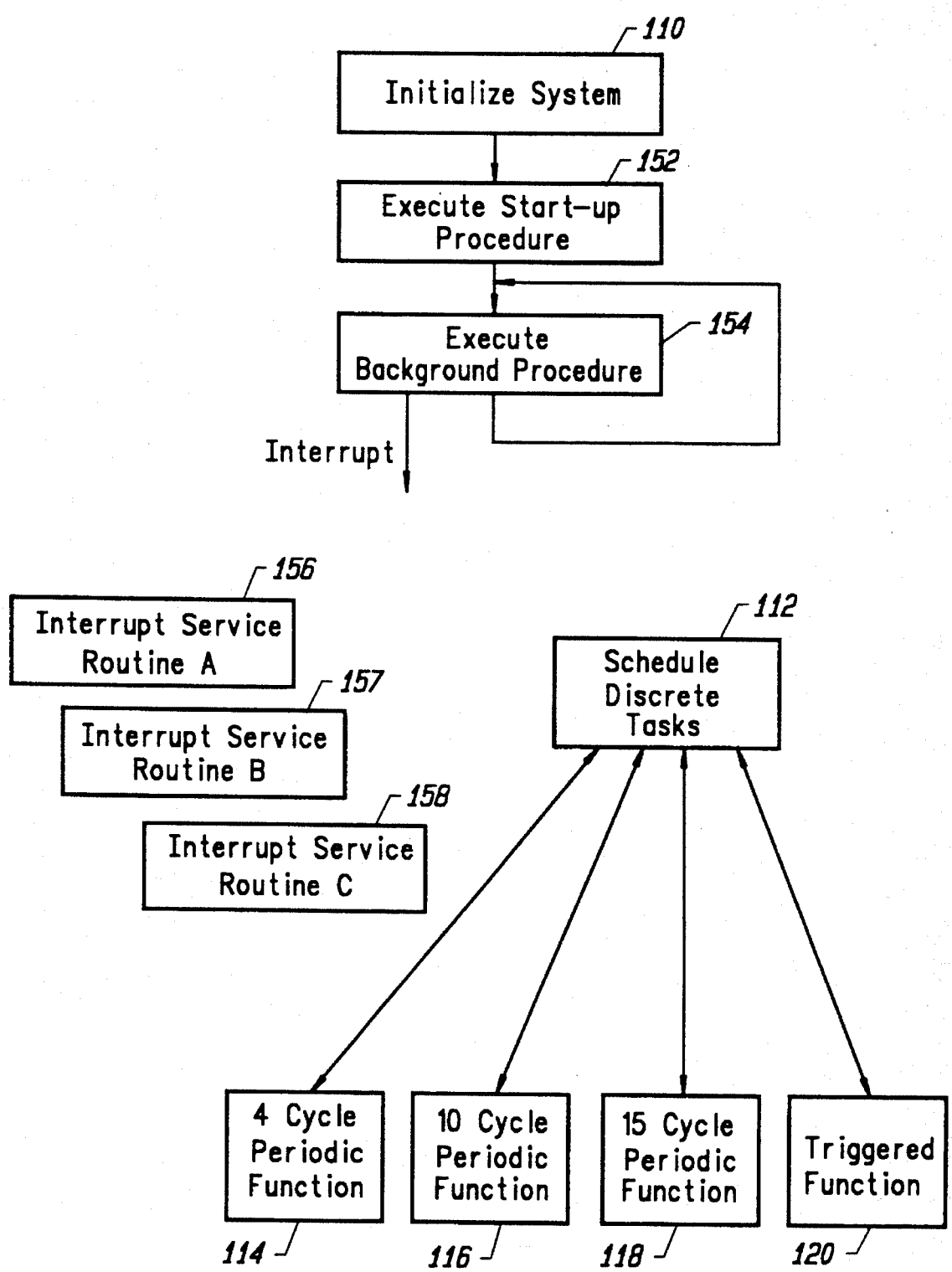
FIG. 8 illustrates the start-up, background, and interrupt procedural operations associated with the present invention.

FIG. 8 illustrates the operation of control software 144 formed in accordance with the invention. The first step associated with the control software 144 is to initialize the system (block 110). This is a standard initialization step. The next step is to execute a start-up job (block 152). Executing the start-up job is equivalent to executing the novel start-up procedure superblock, which was briefly discussed above and will be further discussed below. The next step associated with execution of the control software 144 is to process background jobs (block 154). The background procedure superblock is used to model tasks that are executed in the background during the idle time of the real-time system 20. As will be described below, the background jobs continuously loop, except when interrupt signals are processed. This approach is in contrast to the system shown in FIG. 6, wherein the control software scheduled all system tasks in accordance with a clock.

FIG. 8 illustrates the handling of interrupts in accordance with the invention. On the bottom-right side of the figure it can be seen that some interrupts are handled in accordance with the prior art technique shown in FIG. 6. That is, some interrupts of the executing background procedure are handled according to a time-scheduled approach. The executing background procedure may also be interrupted with a separate class of interrupts. Namely, the present invention handles asynchronous interrupts by processing them in an asynchronous fashion, as opposed to the time scheduled approach of the prior art. The asynchronous interrupt handling technique of the invention includes the interrupt procedure superblock, illustrated as Interrupt Service Routine A (block 156), Interrupt Service Routine B (block 157), and Interrupt Service Routine C (block 158).

Thus, the present invention departs from the prior art in that it handles asynchronous interrupts from a real-time system in an asynchronous manner. This capability is provided by the use of the novel start-up procedure, background procedure, and interrupt procedure superblocks. These new superblocks will be illustrated through an example. However, at this time, attention focuses on how the prior art automatic code generator is modified to accommodate these new procedure superblocks.

Figure 3:
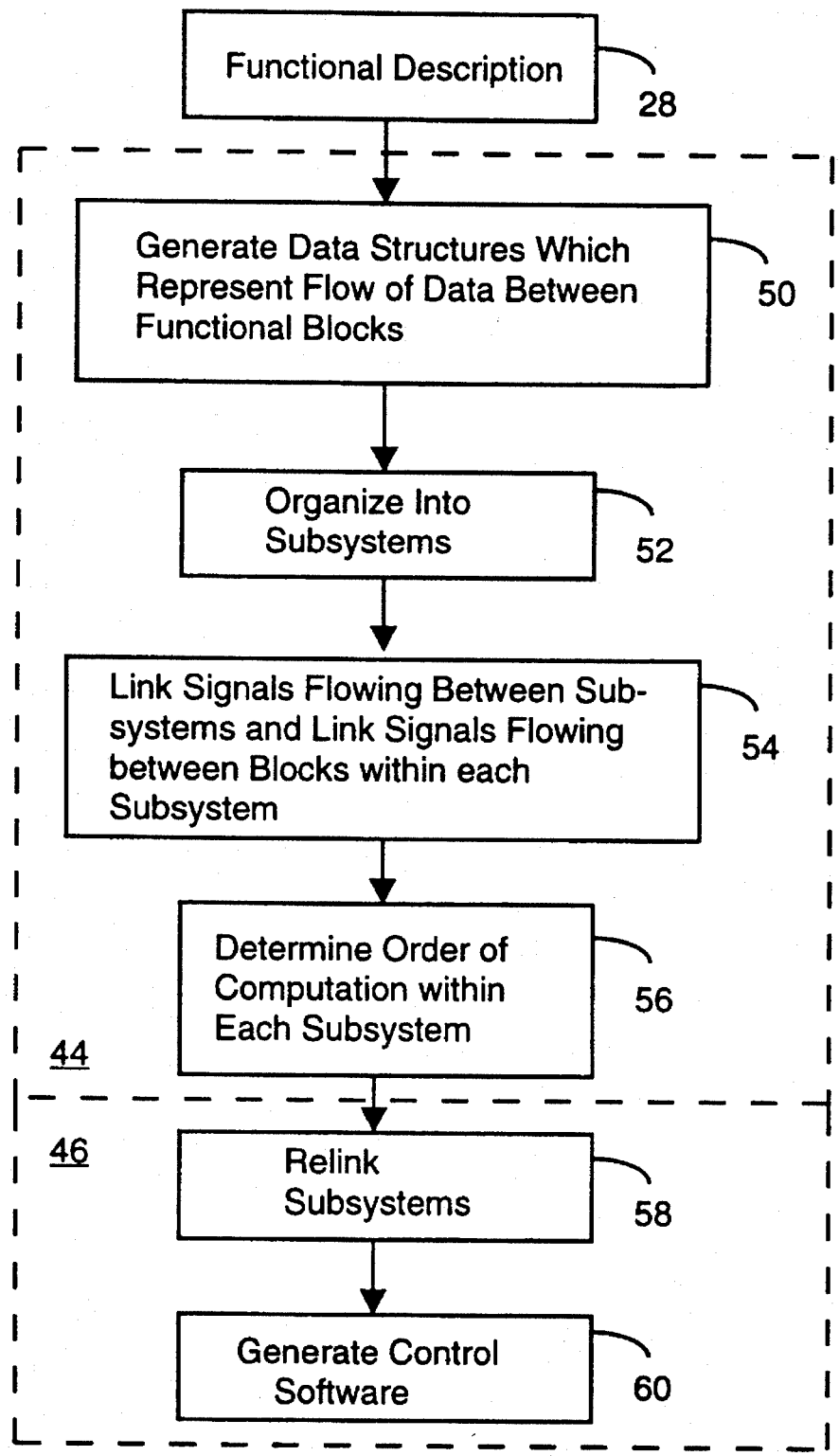
FIG. 3 is a flow chart showing the processing associated with the construction of prior art control software.
Figure 9:
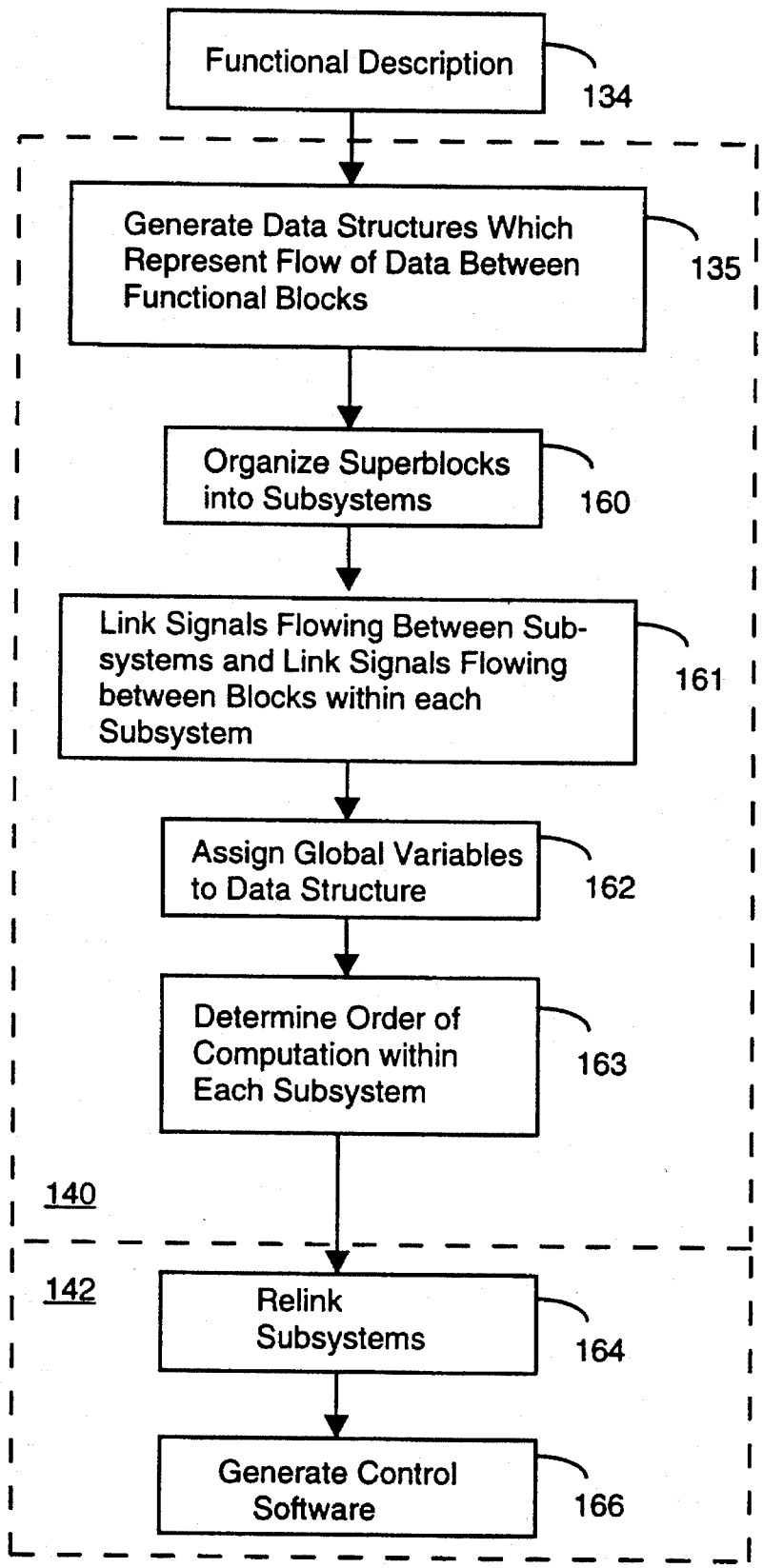
FIG. 9 is a flow chart showing the processing associated with the construction of an asynchronous real-time controller in accordance with the present invention.

FIG. 9 illustrates the automatic code generator 138 of the invention, which generally corresponds with the automatic code generator shown in FIG. 3. The code generator 138 of the invention receives the functional description 134. The first step taken by the code generator 138 is to generate data structures which represent the flow of data between the functional blocks (block 135). This step is the same as prior art step 50, shown in FIG. 3, except that in this case, the functional blocks include the start-up, background, and interrupt procedure functional superblocks of the invention. The next step is to organize the superblocks into synchronous and asynchronous subsystems (block 160). The synchronous subsystems are the continuous, discrete, and triggered superblocks of the prior art. The asynchronous subsystems are the start-up, background, and interrupt procedure superblocks of the invention.

The next step is to link signals flowing between subsystems and to link signals flowing between blocks within each subsystem (block 161). This step generally corresponds to the prior art, but accommodates the asynchronous subsystems of the invention.

Figure 4:
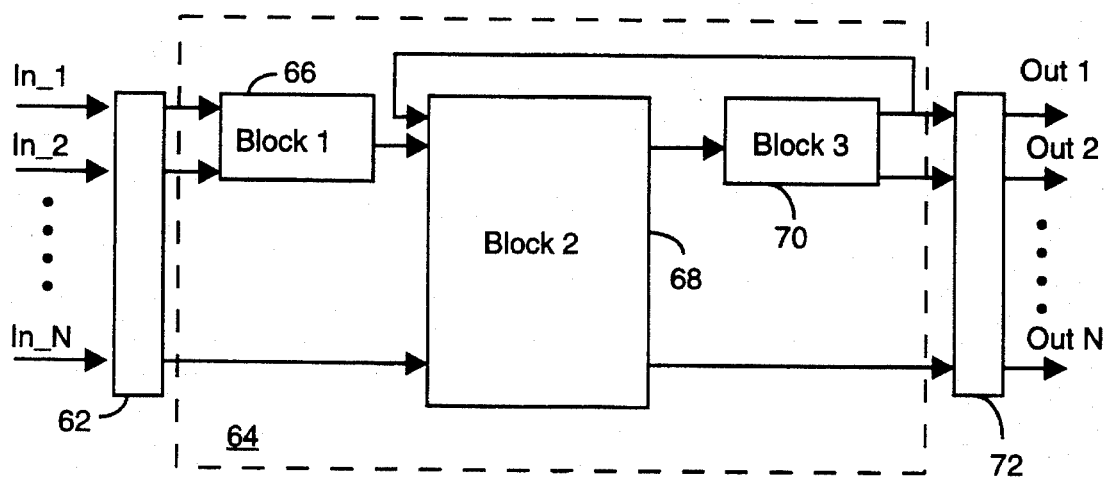
FIG. 4 illustrates a sample and hold buffer and a zero order hold buffer that accompany prior art functional blocks.

The next step shown in FIG. 9 is the creation of a global variable table (block 162). This step establishes the data structures for the variable blocks. In other words, this step provides a global variable data structure table that permits global variables to be written to and read from it in an asynchronous manner. This operation stands in contrast to the buffered values associated with the prior art and described in relation to FIG. 4.

The next processing step shown in FIG. 9 is to determine the order of computation within each subsystem (block 163). This operation is directed toward the synchronous processing of events, and consequently is in accordance with prior art techniques. The next step is to relink the subsystems (block 164). The prior art relinking step is modified to process the global variable data. The final step is to generate the control software (block 166). The resultant control software not only handles scheduled tasks, as in the prior art, but also handles asynchronous tasks.

Figure 5:
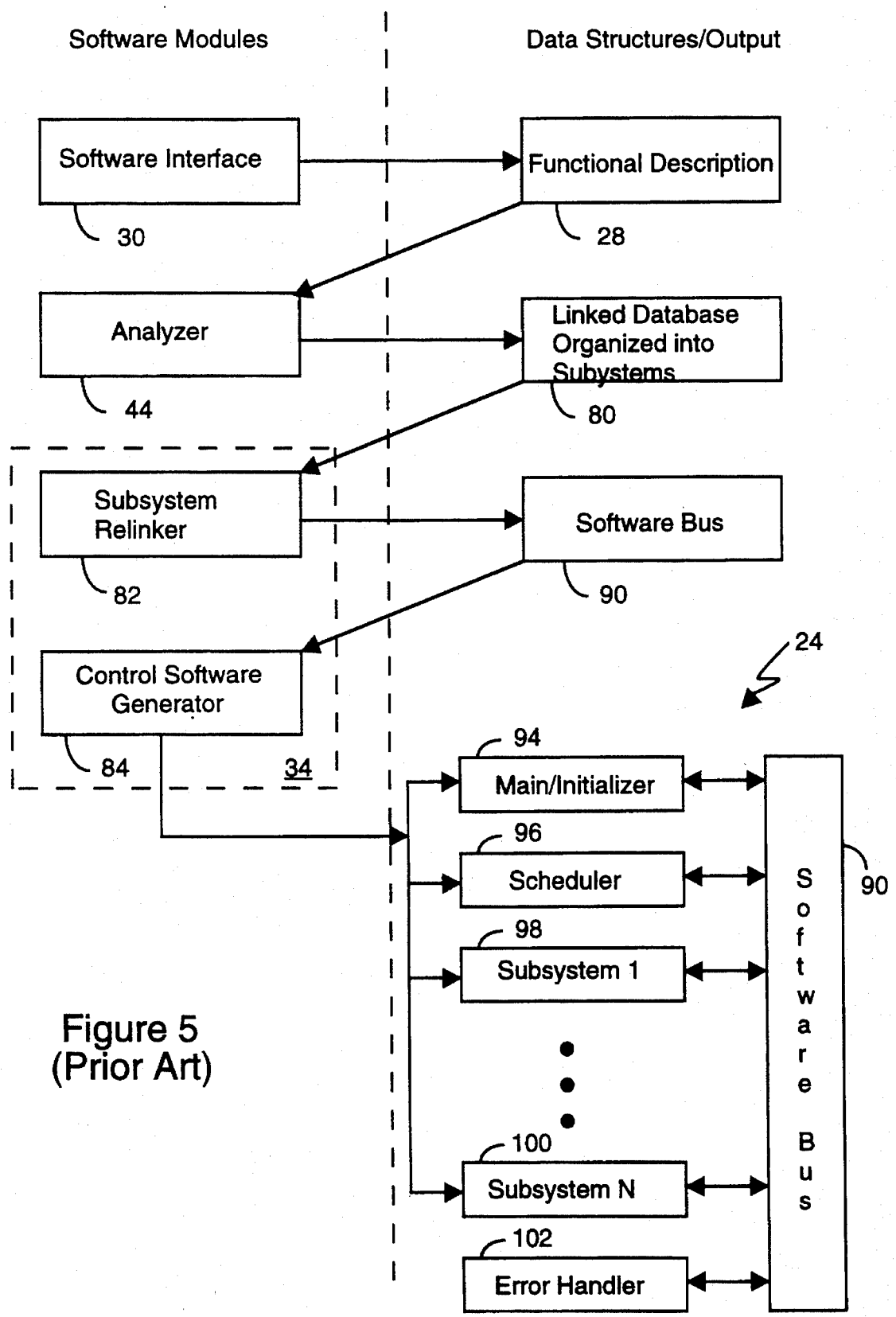
FIG. 5 shows the software processing modules and resultant data structures generated in connection with the processing of FIG. 3.
Figure 10:
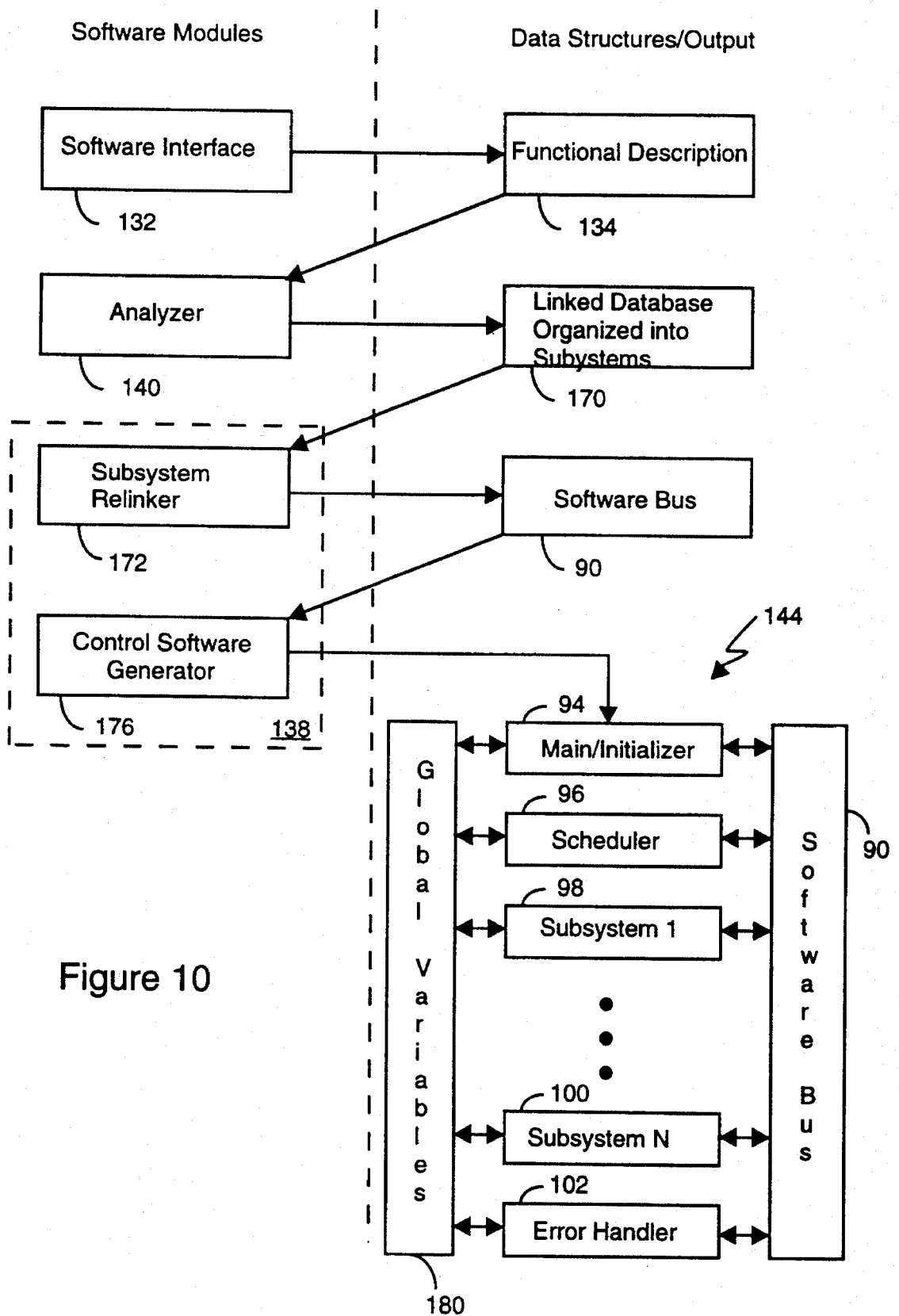
FIG. 10 illustrates the software processing modules and resultant data structures generated in connection with the present invention.

FIG. 10 illustrates the software modules and the corresponding data structure outputs associated with the processing of the code generation system of the invention. FIG. 10 generally corresponds to FIG. 5. The novel software interface 132 is used to author a functional description 134 of a system. The functional description is then processed by the analyzer 140 which yields a linked database of functional operations organized into synchronous and asynchronous subsystems (block 170). The code generator 138 includes a subsystem relinker 172 performing the function described in relation to block 164 in FIG. 9. This results in the previously described software bus 90. Subsequently, a control software generator 176 is invoked to execute the function associated with block 166 of FIG. 9. These operations result in the control software 144. The control software 24 generally corresponds to the control software shown in FIG. 5. However, note that the control software 144 of the invention includes a global variable space 180 that may be accessed by the various elements of the controller 144. The global variable space 180 corresponds to the global variable blocks used in accordance with the invention. As previously indicated, the global variable blocks are used to provide asynchronous processing of physical process interrupts. Note that in the control software 144 of FIG. 10, the numbered subsystems will include the start-up procedure, background procedure, and interrupt procedure of the invention.

An overview of the invention has now been provided. At this time the invention will be more particularly described through the use of a specific example of the construction of an asynchronous real-time controller 146 in accordance with the invention.

Figure 11:
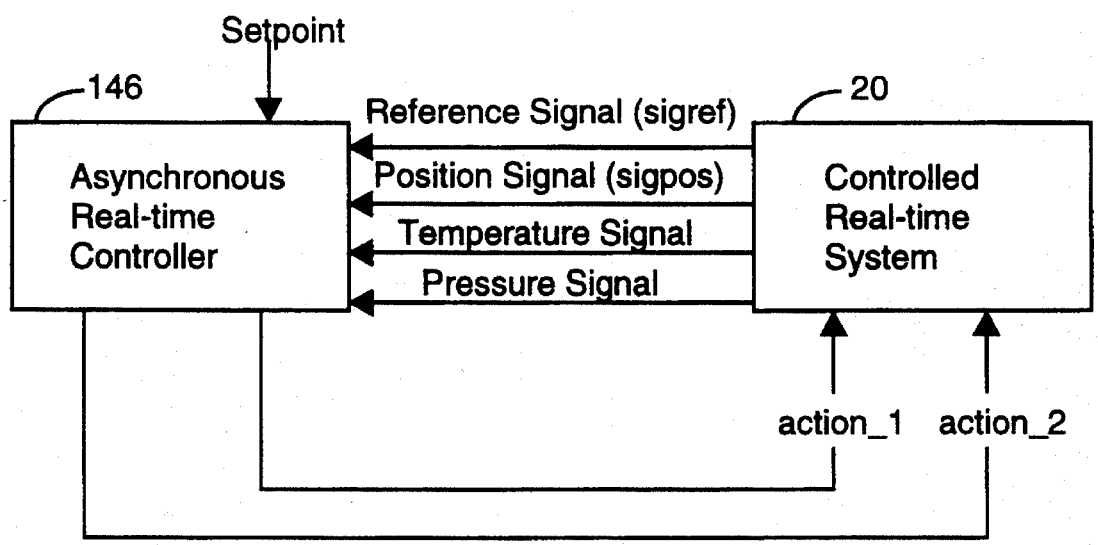
FIG. 11 is an example of a real-time system controlled in accordance with the techniques of the present invention.

FIG. 11 illustrates a simple example of a controlled real-time system 20. In this example, the real-time system 20 is a single shaft system wherein the rotational speed of the shaft is controlled to accomplish some function. The control of the shaft is based upon a number of physical parameters. As shown in FIG. 11, these parameters include a pressure signal, a temperature signal, a position signal (sigpos), and a reference signal (sigref). These signals are sent from the real-time system 20 to the asynchronous real-time controller 146.

The position signal is an asynchronous interrupt signal, in accordance with the invention, which is called everytime the position of the shaft is moved by one degree. The position signal invokes an interrupt service routine that is used to keep track of the instantaneous shaft position. Shaft position sensors for generating the interrupt signal are known in the art.

The reference signal is an interrupt signal, in accordance with the invention, which is called after every complete rotation of the shaft. The reference signal invokes an interrupt service routine that is used to calculate the revolutions per minute (rpm) of the shaft and to execute initialization operations.

The asynchronous real-time controller 146 continuously loops through a background procedure and derives new control actions (action_1 and action_2) for the real-time system 20. The control action is based upon a number of operations executed in accordance with the invention. First, a derived shaft rpm value is used to obtain a speed error signal. The speed error signal is scaled along with the values received from the temperature signal, the pressure signal, and the position signal. The scaled values from the scaling operation are matched with logic values (logic_1, logic_2) in look-up tables. Each value in the look-up table has a corresponding control action. The control actions from the look-up tables are then converted to control signals (action_1 and action_2) that are applied to the real-time system. That is, the control signals are used to control the speed of the shaft to accomplish some function. As will be described below, no control action is taken when the shaft of the real-time system 20 is not synchronized with the controller 146.

Thus, FIG. 11 is an example of a real-time system 20 with asynchronous interrupts (the position signal and the reference signal). The asynchronous controller 146 processes the asynchronous interrupts in an asynchronous manner to generate control actions (action_1 and action_2) for the real-time system 20. Attention now turns to the construction of a functional description of the asynchronous real-time controller 146 of FIG. 11.

Figure 12:
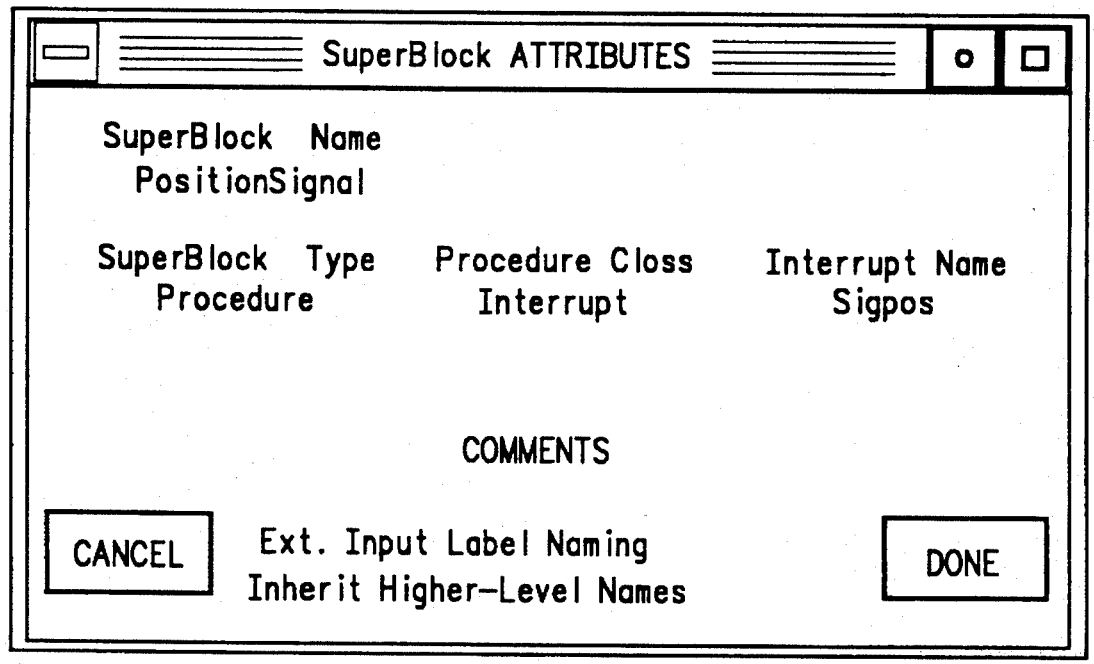
FIG. 12 illustrates a software user interface that may be used to select start-up, background, and interrupt procedures in accordance with the invention.

FIG. 12 illustrates a software interface 132 that may be used to generate a functional description 134 of a real-time system 20. The software user interface 132 includes a menu option for selecting a variety of code construction elements from a functional library 134. The code construction elements of the functional library 134 include a start-up superblock procedure selection option, a background superblock procedure selection option, and an interrupt superblock procedure selection option.

FIG. 12 specifically illustrates the selection of an interrupt procedure superblock named "PositionSignal". In FIG. 12, the superblock type is identified as "Procedure". The Procedure Class is identified as "Interrupt". The Interrupt Name is the "sigpos" signal, corresponding to the Position Signal shown in FIG. 11. These options are selected from a graphical user interface using techniques known in the art.

Figure 13:
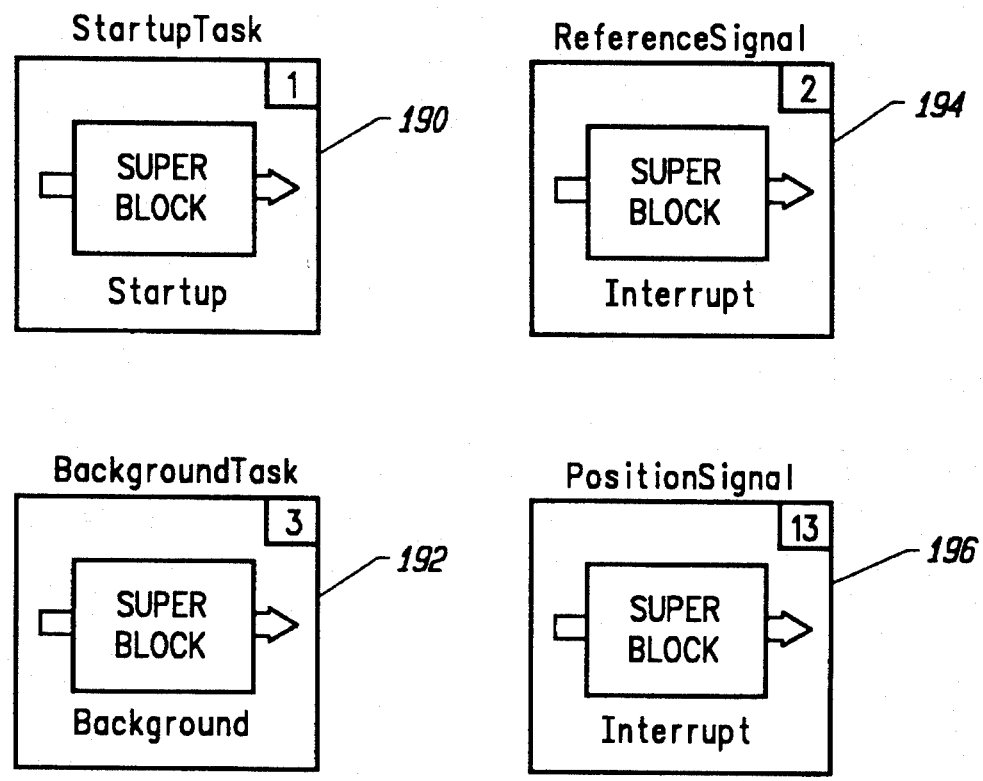
FIG. 13 illustrates selected start-up, background, and interrupt procedures corresponding to the real-time system of FIG. 11.

FIG. 13 illustrates the software interface 132 after all of the superblocks required for the real-time system of FIG. 11 are selected. Block 190 in FIG. 13 represents the startup procedure superblock. Block 192 corresponds to the background procedure superblock. Block 194 is the interrupt procedure superblock called "ReferenceSignal", and block 196 is the interrupt procedure superblock called "PositionSignal". Note that each of these procedure superblocks constitutes an individual subsystem without any external inputs or outputs.

Figure 14:
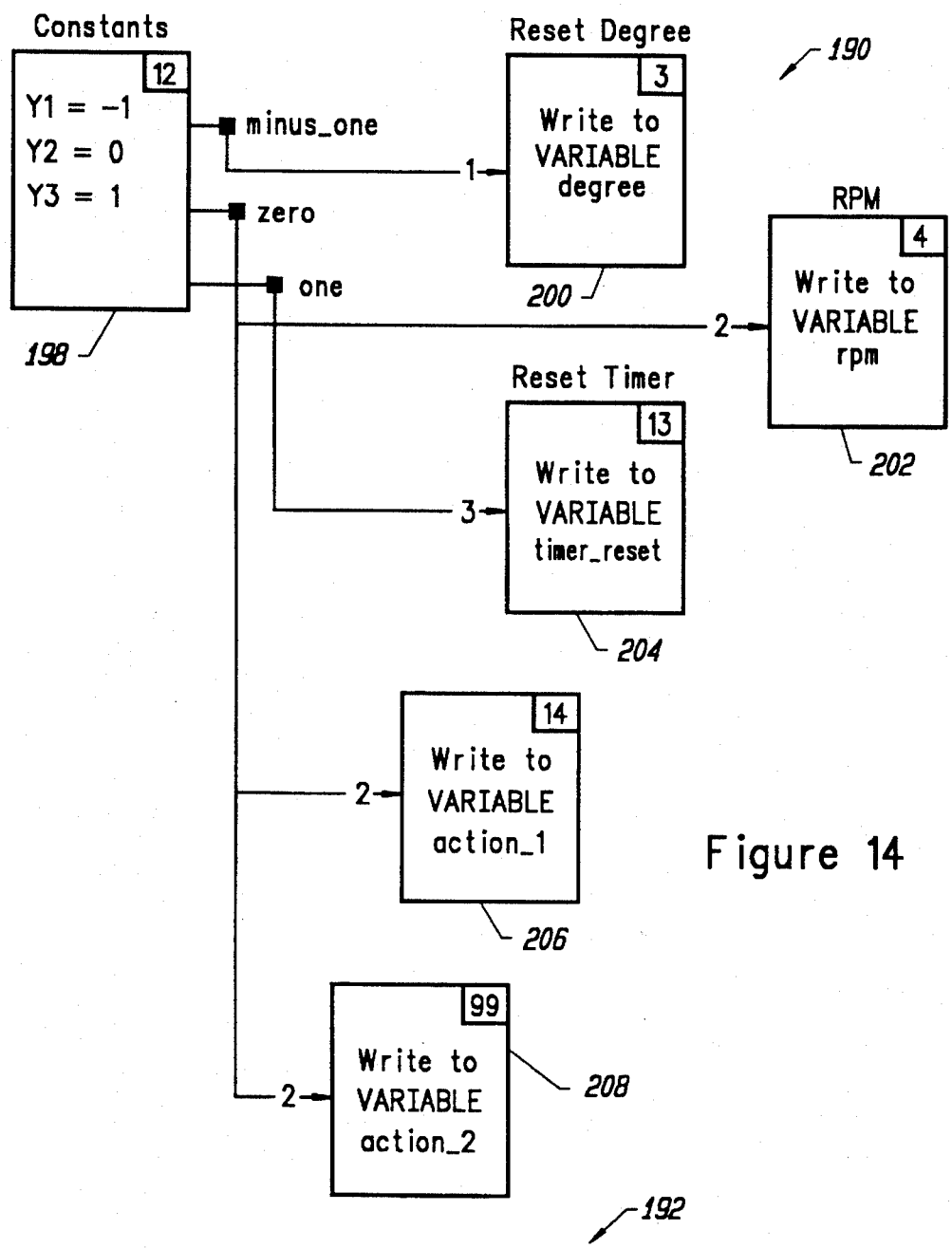
FIG. 14 illustrates the start-up procedure operations performed in conjunction with the real-time system of FIG. 11.

FIG. 14 shows the set of functional operations constituting the startup procedure superblock 190. The first thing to note is that the figure defines a set of variable blocks. The variable blocks are used to define the global variables used in the asynchronous processing of the invention. The variable blocks are selected from the menu as a type of functional operation. The selection of functional operations for the present invention is achieved in the manner described in the prior art, specifically, in the manner described in the '179 patent. The invention herein is not directed toward this feature, rather, the invention is directed toward the new class of superblocks and variable blocks.

In any event, startup procedure superblock 190 serves to initialize global variables of the asynchronous real-time controller. FIG. 14 shows a minus one (−1) value being written to the variable block "degree", a zero (0) value being written to the variable blocks "action_1" and "action_2" and a one (1) value being written to the "timer_reset" variable block. These operations constitute the startup procedure initialization tasks required to characterize the physical system of FIG. 11.

Figure 15:
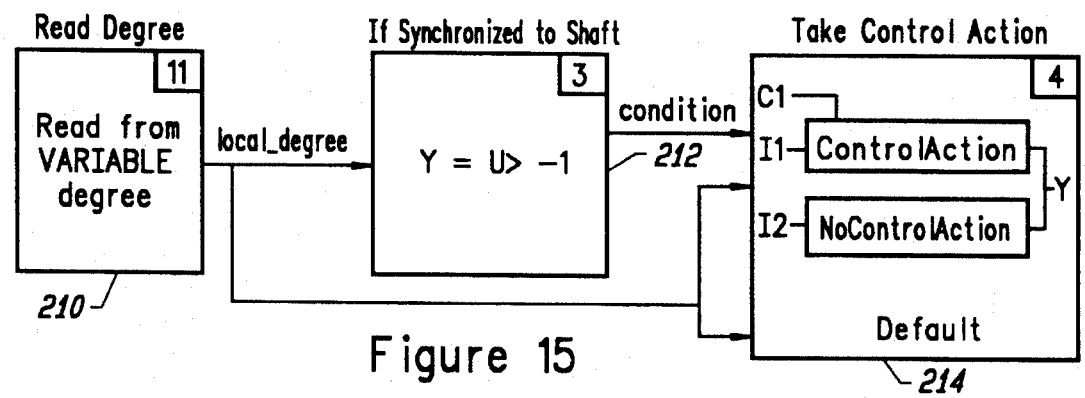
FIG. 15 illustrates the background procedure operations performed in conjunction with the real-time system of FIG. 11.

FIG. 15 shows the functional decomposition of the background procedure 192 superblock for the real-time system of FIG. 11. The background procedure of the invention creates a continuously looping operation. As shown in FIG. 15, the background procedure initially involves reading from the variable block "degree". The variable "degree" value is compared to negative one (−1), if the variable "degree" is greater than negative one (−1), then the shaft of the real-time system is synchronized to the controller 146 and a control action is called. Recall that the variable "degree" was initialized in the start-up procedure to a value of negative one (−1). If the degree value is not greater than negative one (−1), then a "no control action" is called, as will be described below.

Figure 16:
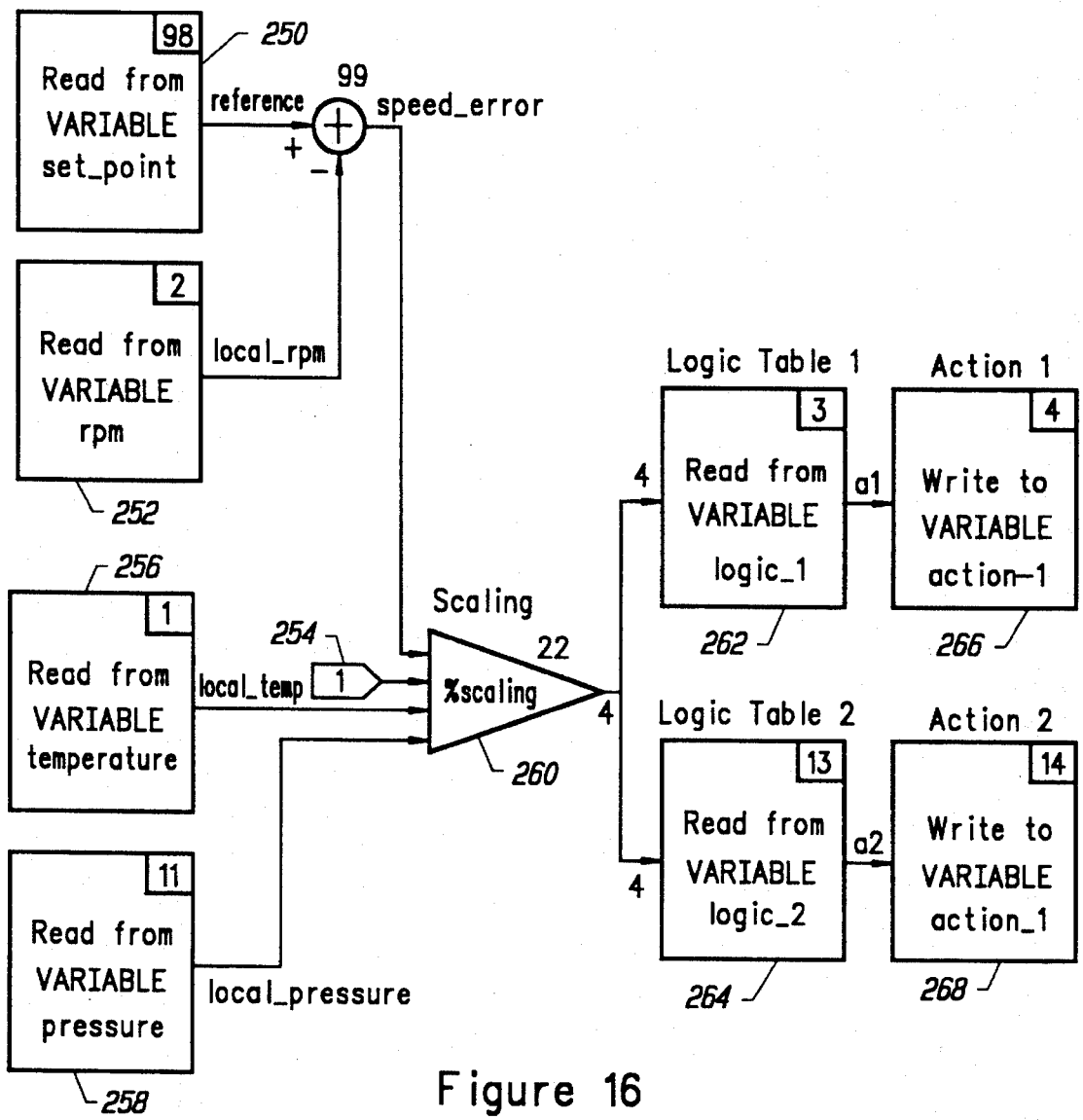
FIG. 16 illustrates "Control Action" operations taken in relation to the real-time system of FIG. 11.

FIG. 16 shows the operations associated with the "control action" function of the real-time system of FIG. 11. Unlike the procedural superblocks of the invention, the control action functional block includes an external input, received at input pad 254. The control action functional block also interacts with the procedural functional blocks of the invention through the use of the variable blocks.

The control action is called by the background superblock 192. The control action of FIG. 16 calculates a "speed_error" signal. The "speed_error" signal is derived from a user-defined "set-point" variable block 250 and the variable block "rpm" 252. As will be described below in relation to the "reference signal" interrupt, the variable block "rpm" is updated once every complete rotation of the shaft of the real-time system 20. The variable block "rpm" is continuously available for the "control action" block. That is, unlike the synchronous system of the prior art which might not write a value to a variable until other system processing is completed, the values for the variable blocks of the invention are always available for read and write operations. Reading and writing to a global variable is only precluded when another interrupt is actively reading or writing to the same global variable.

The "control action" superblock includes an input pad 254, which receives the global variable block "degree" value generated at global variable block 210 in FIG. 15. While the "rpm" global variable of block 252 will only change values once every revolution of the shaft of the real-time system 20, the "degree" global variable is updated every time the shaft is incremented by a degree. Thus, note that the present invention involves a background task continuously reading from a global variable block that is continuously changing. Again, in the prior art, the reading of this variable would be constrained by a buffering of the variable, so that the variable could only be read after related computations were completed.

FIG. 16 also shows the "control action" functional block reading the "temperature" global variable block 256 and the "pressure" global variable block 258 associated with the real-time system 20. Each of the described variables is then applied to a scaling function 260 for the performance of a scaling operation. Scaling operations of this-type are known in the art. The scaling function 260-generates four scaled output signals: reference (corresponding to set_point), local_rpm (corresponding to rpm), local_temp (corresponding to temperature), and local_pressure (corresponding to pressure). The scaled values are then compared to values in a first logic table 262 and a second logic table 264, which are both preferably implemented as look-up tables. Thus, the scaled values are matched with values in the look-up tables. Each matched value has a corresponding control action. FIG. 16 shows at block 266 that a control action is written to a global variable block "action_1", and at block 268 a control action is written to global variable block "action_2". Note that the writing to these global variable blocks is performed in an asynchronous manner. That is, the writing to the variables is not performed in response to a clock signal or other type of scheduling, as is done in the prior art. The global variables "action_1" and "action_2" are used, in a manner known in the art, to derive control signals that are applied to the real-time system 20, as shown in FIG. 11.

Figure 17:
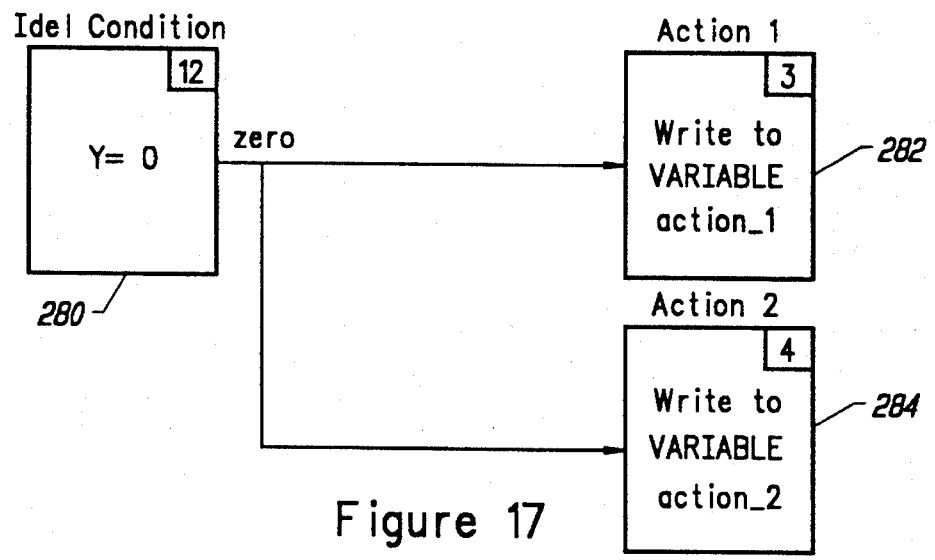
FIG. 17 illustrates a "No Control Action" processing option derived in relation to the real-time system of FIG. 11.

FIG. 17 shows a "NoControlAction" operation that is executed when the test in the background procedure is not satisfied. That is, when the shaft of the real-time system is not synchronized to the controller (degree=-1) the "NoControlAction" of FIG. 17 is performed. As shown in the figure, this operation simply assigns a zero value to the "action_1" and "action_2" global variables.

Figure 18:
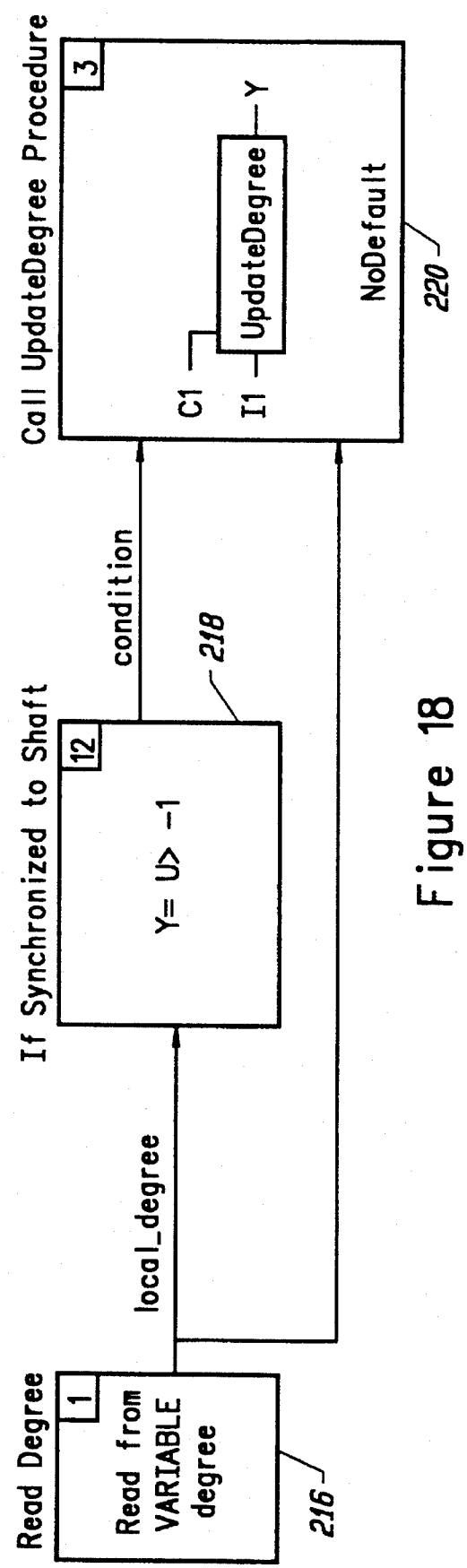
FIG. 18 illustrates the operations associated with the "Position Signal" interrupt service routine corresponding to the real-time system of FIG. 11.

FIG. 18 shows the processing resulting from the position interrupt signal produced by the real-time system 20. That is, FIG. 18 shows the processing associated with the position signal interrupt procedure superblock 196 of the invention. The first operation associated with the interrupt procedure superblock 196 is to read from the global variable block "degree" (block 216). The next step is to determine whether the "degree" variable is greater than negative one (-1) (block 218). If it is, this indicates that the shaft is synchronized to the controller. If synchronization is not present, then no action is taken. If synchronization is present, then the "UpdateDegree" operation is called (block 220).

Figure 19:
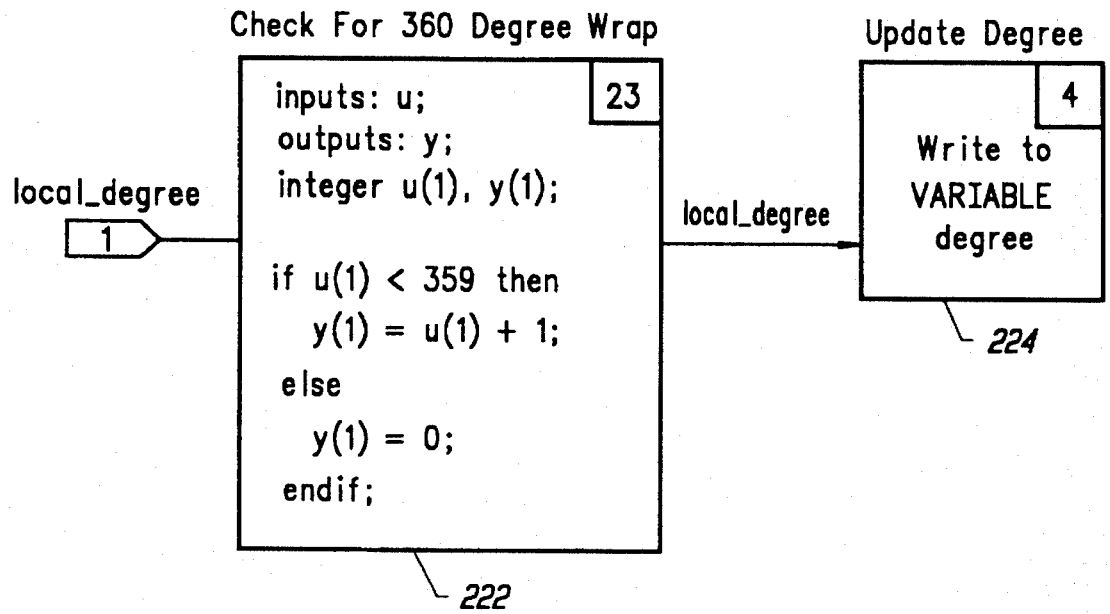
FIG. 19 depicts the "Update Degree" interrupt service routine corresponding to the real-time system of FIG. 11.

A software interface 132 for defining the "UpdateDegree" operation is illustrated in FIG. 19. The "UpdateDegree" operation receives an external input "local_degree". As indicated in block 222, if the "local_degree" variable is less than 359, then it is incremented by one, otherwise its value is set to zero. In either case, the updated value is written to the global variable block "degree" (block 224). Thus, pursuant to the "UpdateDegree" block of FIG. 19, the global variable "degree" is repeatedly written to. As previously indicated, this global variable is available for asynchronous processing in the "ControlAction" functional block.

Figure 20:
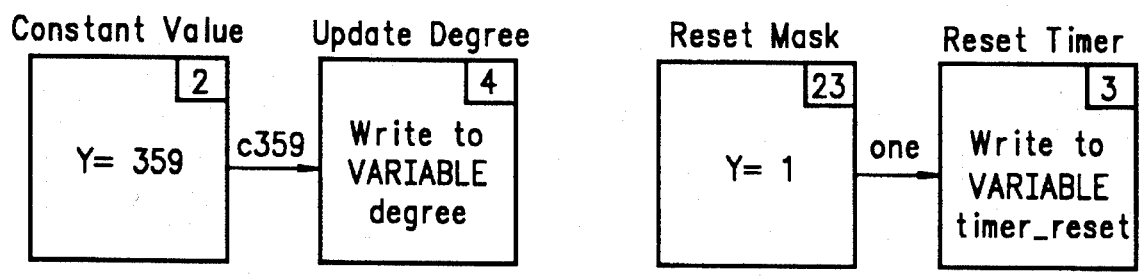
FIG. 20 illustrates the operations associated with the "Reference Signal" interrupt service routine corresponding to the real-time system of FIG. 11.
Figure 20:
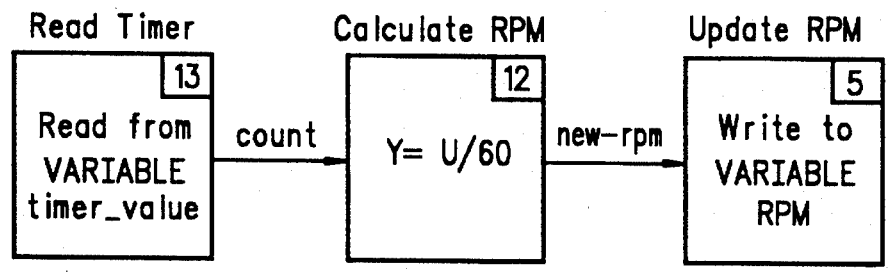

FIG. 20 illustrates the blocks that are combined to construct the "ReferenceSignal" interrupt procedure superblock 194. When a reference signal interrupt is received, the constant value of 359 (block 236) is written to the global variable block "degree" (block 238). The "ReferenceSignal" interrupt procedure also entails assigning a value of one to the "timer_reset" global variable block. This resets the timer that is used to calculate the rpm of the shaft. The final operations performed by the "ReferenceSignal" interrupt procedure are to read from the variable "timer_value" (block 230) to obtain a local variable "count", to divide the count value by 60 (block 232) to obtain a "new_rpm" local variable, and to write the local variable "new_rpm" to the global variable "rpm". The new "rpm" variable is then available for asynchronous processing in the "ControlAction" functional block.

Given the foregoing functional description 134 described in relation to FIGS. 12–20, the code generator 138 of the invention produces the following code which serves to further illustrate the operation of the invention.

```
/*************************************************************
|           AutoCode/C (TM) Code Generator V4.0
|
|               INTEGRATED SYSTEMS INC.,
|               SANTA CLARA, CALIFORNIA
|
*************************************************************/
        #include <stdio.h>
        #include <math.h>
        #include "sa_system.h"
        #include "sa_defn.h"
        #include "sa_types.h"
        #include "sa_math.h"
        #include "sa_user.h"
        #include "sa_utils.h"
        #include "sa_time.h"
        #include "sa_fuzzy.h"
```

The foregoing code calls a number of standard standalone ("sa") files that are available in the environment of commercially available code generation systems. The following code constitutes the declaration section of the program. Specifically, the code declares a "DcZero" structure. This structure is used to provide default connections for unconnected nodes on superblocks. As previously indicated, the procedure superblocks of the invention do not have external connections. Therefore, "DcZero" structure is used to provide default connections.

```
/*** System Data ***/
/* Structure to drive disconnected input/output. */
struct _DcZero {
    RT_FLOAT dzero;
    RT_INTEGER izero;
    RT_BOOLEAN bzero;
};
static const struct _DcZero dczero = {0.0, 0, FALSE};
#define NTASKS          0
#define NUMIN           0
#define NUMOUT          1
static RT_INTEGER ERROR_FLAG [NTASKS+1];
static RT_BOOLEAN SUBSYS_INIT [NTASKS+1];
static RT_DURATION SUBSYS_TIME [NTASKS+1];
static enum TASK_STATE_TYPE TASK_STATE
[NTASKS+1];
/** System Ext I/O and Sample-Hold type declarations.*/
struct _Sys_ExtOut {
    RT_FLOAT dzero;
};
/*System Ext I/O and Subsystem I/O type definitions and
Pointers to SubSystem Outputs ReadOnly/Work areas. */
struct _Sys_ExtOut sys_extout;
static RT_FLOAT ExtIn [NUMIN+1];
static RT_FLOAT ExtOut [NUMOUT+1];
```

The following code provides global variable definitions corresponding to the global variable blocks. Each of the defined global variables has been discussed in relation to the example shown in FIGS. 12–20. Note that prior art real-time controllers do not include these global variables, which are used to provide asynchronous handling of asynchronous events.

```
/* Model variable definitions. */
VAR_INTEGER degree;
VAR_INTEGER action_1;
VAR_INTEGER temperature;
VAR_INTEGER pressure;
VAR_INTEGER rpm;
VAR_INTEGER logic_1[10][360][10][10];
VAR_INTEGER logic_2[10][360][10][10];
VAR_INTEGER set_point;
VAR_INTEGER action_2;
VAR_INTEGER timer_reset;
VAR_INTEGER timer_value;
```

The following code represents the formal declarations of the global variables defined in the previous block of code. Note that the look-up table variables (logic_1 and logic_2) are 10×360×10×10 arrays of data. The term 360 corresponds to the global variable "degree".

```
/* Model variable declarations. */
extern VAR_INTEGER degree;
extern VAR_INTEGER action_1;
extern VAR_INTEGER temperature;
extern VAR_INTEGER pressure;
extern VAR_INTEGER rpm;
extern VAR_INTEGER logic_1[10][360][10][10];
extern VAR_INTEGER logic_2[10][360][10][10];
extern VAR_INTEGER set_point;
extern VAR_INTEGER action_2;
extern VAR_INTEGER timer_reset;
eftern VAR_INTEGER timer_value;
```

The following code defines and declares the scaling operation described in relation to element 260 of FIG. 16.

```
/* Xmath variable definitions. */
VAR_INTEGER scaling[4];
/* Xmath variable declarations. */
extern VAR_INTEGER scaling[4];
```

The following code declares the various procedures associated with the example of the invention. That is, the following code declares the procedures "ControlAction", "NoControlAction", "UpdateDegree", "StartupTask", "BackgroundTask", "PositionSignal", and "ReferenceSignal", each of which were described in relation to FIGS. 12–20.

```
/****** Procedures' declarations ******/
/****** Procedure: ControlAction ******/
/***** Inputs type declaration. *****/
struct _ControlAction_u {
    RT_INTEGER local_degree;
};
/***** Info type declaration. *****/
struct _ControlAction_info {
    RT_INTEGER iinfo[5];
    RT_FLOAT rinfo[5];
    RT_INTEGER IP[2];
    VAR_INTEGER *scaling;
};
extern void ControlAction();
/******* Procedure: NoControlAction *******/
/***** Inputs type declaration. *****/
struct _NoControlAction_u {
    RT_INTEGER local_degree;
};
/***** Info type declaration. *****/
struct _NoControlAction_info {
    RT_INTEGER iinfo[5];
    RT_FLOAT rinfo[5];
};
extern void NoControlAction();
/******* Procedure: UpdateDegree *******/
/***** Inputs type declaration. *****/
struct _UpdateDegree_u {
    RT_INTEGER local_degree;
};
/***** Info type declaration. *****/
struct _UpdateDegree_info {
    RT_INTEGER iinfo[5];
    RT_FLOAT rinfo[5];
};
extern void UpdateDegree();
/******* Procedure: StartupTask *******/
extern void StartupTask();
/******* Procedure: BackgroundTask *******/
extern void BackgroundTask();
/******* Procedure: PositionSignal *******/
extern void PositionSignal();
/******* Procedure: ReferenceSignal *******/
extern void ReferenceSignal();
```

The following code constitutes the main body of the program. The first operations relate to the initialization of data. This initialization step is shown as block 110 in FIGS. 6 and 8. It is a standard step in the art. The next operation is a call to the previously described "StartupTask" procedure. The next lines of code install the interrupt procedures of the invention. That is, an interrupt handler is installed for the "PositionSignal" procedure and its corresponding interrupt signal "sigpos". Subsequently, whenever the "sigpos" interrupt signal is produced by the real-time system 20, the "PositionSignal" procedure is invoked. An interrupt handler is also installed for the "ReferenceSignal" procedure and its corresponding interrupt signal "sigref". The last lines of the main body of the program call the background procedure. That is, the background procedure is placed in a continuous loop and is therefore continuously called. The receipt of the interrupt signals "sigpos" and "sigref" temporarily halt this looping operation as interrupt operations are performed. The main body code of the program is as follows.

```
/*---------*
 *-- MAIN --*
 *---------*/
MAIN()
{
    extern void Init_Application_Data();
    /*** Initialize Application Data ***/
    Init_Application_Data();
    /*** Call Startup Procedures ***/
    StartupTask();
    /*** Install Interrupt Procedures ***/
    InstallInterruptHdlr(PositionSignal, sigpos);
    InstallInterruptHdlr(ReferenceSignal, sigref);
    /*** Start Background Task ***/
    while(1) {
        BackgroundTask();
    }
}
```

The following code describes the operations to be performed in each of the previously declared procedures. The first procedure initializes the system. As previously indicated, this operation corresponds to block 110 in FIGS. 6 and 8. Note in the following code the term "logic_1_K [360000]={ . . . }". As previously indicated, the "logic_1" term refers to a look-up table. The "K[360000]" term indicates that there are 360,000 entries in the table. The "{ . . . }" term indicates that the entries are omitted for the sake of simplicity. The same approach is used in relation to the "logic_2" term. Note that the "scaling" term has four entries, or scaling values, which are simply designated as A, B, C, and D. The scaling is performed by multiplying the "speed_error" variable by "A", the "local_degree" variable by "B", the "local_temp" variable by "C", and the "local_pressure" variable by "D". The foregoing values for the scaling and the omitted values for the look-up tables (logic_1 and logic_2) are declared as constants. The remaining code is used to initialize values to zero.

```
/******** Procedures' definitions ********/
static void Init_Application_Data ()
{
    static const VAR_INTEGER logic_1_K[360000] = { . . . };
    static const VAR_INTEGER logic_2_K[360000] = { . . . };
    static const VAR_INTEGER scaling_K[4] = {A,B,C,D};
    RT_INTEGER *iptr;
    RT_INTEGER i;
    /* Variable blocks initialization. */
    degree = 0;
    action_1 = 0;
    temperature = 0;
    pressure = 0;
    rpm = 0;
    iptr = &logic_1[0][0][0][0];
    for( i=0;i<36000;i++ ) {
        iptr[i] = logic_1_K[i];
    }
    iptr = &logic_2[0][0][0][0];
    for( i= 0;i<360000;i++ ) {
        iptr[i] = logic_2_K[i];
    }
    set_point = 0;
    action_2 = 0;
    timer_reset = 0;
    timer_value = 0;
    /* Xmath variables initialization. */
    iptr = &scaling[0];
    for( i=0;i<4;i++ ) {
        iptr[i] = scaling_K[i];
    }
    /* External outputs initialization. */
    sys_extout.dzero = -EPSILON;
}
```

The generated code corresponding to the "StartupTask" shown in FIG. 14 follows. The first thing to note about the "StartupTask" procedure of the invention is that its parameter list is empty "( )". Each of the new procedures (Startup, Background, Interrupt) disclosed in accordance with the invention has this characteristic. Each of these procedures is processed asynchronously; the procedures are not processed by the synchronous scheduler 96, shown in FIGS. 5 and 10. In the code, note that "minus_one", "zero", and "one" variables are declared and then assigned values. The subsequent code shows these values being written to the global variables "action_2", "action_1", "rpm", "timer_reset", and "degree". It is important to note that prior to each write operation, a disable command is used. The disable command effectively advises the operating system not to process any other interrupts during the write operation. When the write operation is completed, an enable command is used to restore standard interrupt processing. This sequence of operations insures that the global variables maintain accurate values.

```
/******* Procedure: StartupTask *******/
void StartupTask()
{
    static RT_INTEGER iinfo[4] = {0,1,1,1};
    static RT_FLOAT rinfo[5] = {0.0,0.0,0.0,0.0,0.0};
    /***** Local Block Outputs. *****/
    RT_INTEGER minus_one;
    RT_INTEGER zero;
    RT_INTEGER one;
    /***** Output Update. *****/
    /* ---Algebraic Expression */
    /* {StartupTask.Constants.12} */
    minus_one = -1;
    zero = 0;
    one = 1;
    /* ---Write to Variable */
    /* {StartupTask..99} */
    Disable;
    action_2 = zero;
    Enable;
    /* ---Write to Variable */
    /* {StartupTask..14} */
    Disable;
    action_1 = zero;
    Enable;
    /* ---Write to Variable */
    /* {StartupTask.RPM.4} */
    Disable;
    rpm = zero;
    Enable;
    /* ---Write to Variable */
    /* {StartupTask.Reset Timer.13} */
    Disable;
    timer_reset = one;
    Enable;
    /* ---Write to Variable */
    /* {StartupTask.Reset Degree.3} */
    Disable;
    degree = minus_one;
    Enable,
```

```
    iinfo[1] = 0;
EXEC_ERROR: return;
}
```

The "BackgroundTask" constructed on the software interface 132 and shown in FIG. 15 results in the following code. The first lines of code refer to an "iinfo" variable that is used to copy error status information. The next block of code defines output variables, while the subsequent block of code initializes the output variables. Note that the code executes a disable command, reads the "degree" global variable and assigns it to a "local_degree" variable, and then executes an enable command. In this way, processing proceeds in relation to the "local_degree" variable, while the global variable "degree" is almost immediately available for subsequent reading and writing by other interrupt operations.

The next lines of code test the "local_degree" variable against the previously described negative one (−1) synchronization test condition. Based upon the outcome of this test, the "If_Synchronized_to_Shaft_1" variable is either assigned a "1" or "0" value. The next lines of code dictate that if the latter variable is greater than 0, then the previously described control action is taken. The control action is called by the term "ControlAction(&ControlAction_4_u, &ControlAction_4_i)". The value of the "local_degree" variable is passed through the "&ControlAction_4_u" term. An error condition is tested by the term "if(iinfo[0]!=0)". If an error exists, processing in the procedure stops as the "goto" clause places control at the end of the procedure. The following code indicates that similar processing is performed if the "If_Synchronized_to_Shaft_1" variable is zero.

```
/******* Procedure: BackgroundTask *******/
void BackgroundTask()
{
    static RT_INTEGER iinfo[4] = {0,1,1,1};
    static RT_FLOAT rinfo[5] = {0.0,0.0,0.0,0.0,0.0};
    RT_INTEGER INIT = iinfo[1];
    /***** Local Block Outputs. *****/
    RT_INTEGER local_degree;
    RT_INTEGER condition;
    struct _ControlAction_u ControlAction_4_u;
    static struct _ControlAction_info
ControlAction_4_i;
    struct _NoControlAction_u NoControlAction_4_u;
    static struct _NoControlAction_info
NoControlAction_4_i;
    /******* Initialization. *******/
    if( INIT ) {
        ControlAction_4_i.iinfo[0] = iinfo[0];
        ControlAction_4_i.iinfo[1] = iinfo[1];
        ControlAction_4_i.iinfo[3] = iinfo[3];
        NoControlAction_4_i.iinfo[0] = iinfo[0];
        NoControlAction_4_i.iinfo[1] = iinfo[1];
        NoControlAction_4_i.iinfo[3] = iinfo[3];
    }
    /***** Output Update. *****/
    /* --- Read from Variable */
    /* {BackgroundTask.Read Degree.11} */
    Disable;
    local_degree = degree;
    Enable;
    /* --- Logical Expression */
    /* {BackgroundTask.If Synchronized to Shaft.3} */
    if (local_degree > −1) {
        condition = 1;
    }
    else {
        condition = 0;
    }
```

```
    /* ---- Condition Block */
    /* {Take Control Action.4} */
    if( condition > 0 ) {
        /* ---- Procedure Super Block */
        /* {ControlAction.4} */
        ControlAction_4_u.local_degree = local_degree;
        ControlAction(&ControlAction_4_u,
            &ControlAction_4_i);
        iinfo[0] = ControlAction_4_i.iinfo[0];
        if( iinfo[0] != 0 ) {
            ControlAction_4_i.iinfo[0] = 0; goto
            EXEC_ERROR;
        }
    }
    else {
        /* --- Procedure Super Block */
        /* {NoControlAction.4} */
        NoControlAction_4_u.local_degree =
            local_degree;
        NoControlAction(&NoControlAction_4_u,
            &NoControlAction_4_i);
        iinfo[0] = NoControlAction_4_i.iinfo[0];
        if( iinfo[0] != 0 ) {
            NoControlAction_4_i.iinfo[0] = 0; goto
            EXEC_ERROR;
        }
    }
    INIT = 0;
    iinfo[1] = 0;
EXEC_ERROR: return;
}
```

The following procedure represents the code generated in response to the functional description of the "ControlAction" procedure of FIG. 16. Note that the code includes a number of local variables, introduced by the "Local Block Outputs" comment. The previously described global variables are then written to these local values. Derivation of the "speed_error" signal is shown in the code. The code also shows the scaling of the "speed_error" variable, the "local_degree" variable, the "local_temp" variable, and the "local_pressure" variable. The values for the scaling terms were previously declared in the initialization section. The subsequent code shows the scaled values being read from the two look-up tables "Logic_Table_2_1" and "Logic_Table_1_1". The final code in the procedure shows the operations derived from the look-up tables being written to the control action variables (action_1 and action_2). Note that a disable command is used before the write operation and an enable command is used after the write operation.

```
/******* Procedure: ControlAction *******/
void ControlAction(U, I)
    struct _ControlAction_u *U;
    struct _ControlAction_info *I;
{
    RT_INTEGER *iinfo = &I->iinfo[0];
    RT_FLOAT *rinfo = &I->rinfo[0];
    RT_INTEGER INIT = iinfo[1];
    /***** Parameters. *****/
    RT_INTEGER *I_P = &I->IP[0];
    RT_INTEGER cnt;
    static const RT_INTEGER I_P[2] = {1, −1};
    /***** Local Block Outputs. *****/
    RT_INTEGER local_temp;
    RT_INTEGER local_pressure;
    RT_INTEGER local_rpm;
    RT_INTEGER reference;
    RT_INTEGER speed_error;
    RT_INTEGER Scaling_1;
    RT_INTEGER Scaling_2;
    RT_INTEGER Scaling_3;
    RT_INTEGER Scaling_4;
    RT_INTEGER a1;
```

```
    RT_INTEGER a2;
    /******* Initialization. *******/
    if( INIT ) {
        for( cnt=0;cnt<2;cnt++ ) {
            I_P[cnt] = _I_P[cnt];
        }
    }
    /***** Output Update. *****/
    /* --- Read from Variable */
    /* {ControlAction..1} */
    Disable;
    local_temp = temperature;
    Enable;
    /* --- Read from Variable */
    /* {ControlAction..11} */
    Disable;
    local_pressure = pressure;
    Enable;
    /* --- Read from Variable */
    /* {ControlAction..2} */
    Disable;
    local_rpm = rpm;
    Enable;
    /* --- Read from Variable */
    /* {ControlAction..98} */
    Disable;
    reference = set_Point;
    Enable;
    /* --- Sum of Vectors */
    /* {ControlAction..99} */
    speed_error = reference - local_rpm
    /* --- Gain Block */
    /* {ControlAction.Scaling.22} */
    Scaling_1 = I->scaling[0]*speed_error;
    Scaling_2 = I->scaling[1]*U->local_degree;
    Scaling_3 = I->scaling[2]*local_temp;
    Scaling_4 = I->scaling[3]*local_pressure;
    /* --- Read from Variable */
    /* {ControlAction.Logic Table 1.3} */
    Disable;
    a1 =
logic_1[Scaling_1][Scaling_2][Scaling_3][Scaling_4];
    Enable;
    /* --- Read from Variable */
    /* {ControlAction.Logic Table 2.13} */
    Disable;
    a2 =
logic_2[Scaling_1][Scaling_2][Scaling_3][Scaling_4];
    Enable;
    /* --- Write to Variable */
    /* {ControlAction.Action 2.14} */
    Disable;
    action_2 = a2;
    Enable;
    /* --- Write to Variable */
    /* {ControlAction.Action 1.4} */
    Disable;
    action_1 = a1;
    Enable;
    INIT = 0;
    iinfo[1] = 0;
EXEC_ERROR: return;
}
```

The "NoControlAction" functional description shown in FIG. 17 results in the generation of the following code. This code merely assigns the "action_1" and "action_2" variables to zero.

```
/******* Procedure: NoControlAction *******/
void NoControlAction(U, I)
    struct _NoControlAction_u *U;
    struct _NoControlAction_info *I;
{
    RT_INTEGER *iinfo = &I->iinfo[0];
    RT_FLOAT *rinfo = &I->rinfo[0];
    /***** Local Block outputs. *****/
```

```
    RT_INTEGER zero;
    /***** Output Update. *****/
    /* --- Algebraic Expression */
    /* {NoControlAction.Ideal Condition.12} */
    zero = 0;
    /* --- Write to Variable */
    /* {NoControlAction.Action 2.4} */
    Disable;
    action_2 = zero;
    Enable;
    /* --- Write to Variable */
    /* {NoControlAction.Action 1.3} */
    Disable;
    action_1 = zero;
    Enable;
    iinfo[1] = 0;
EXEC_ERROR: return;
}
```

The code generated in response to the functional description of FIG. 18 is shown below. The first portions of the code perform initialization tasks. Then, the previously described test for synchronization is executed. If synchronization exists, then the "UpdateDegree" procedure is called by the "UpdateDegree(&UpdateDegree_3_u &UpdateDegree_3_i)" code. The value of the "local_degree" variable is passed to the "UpdateDegree" procedure through the "&UpdateDegree_3_u" term. The code also includes the previously described error handling code. Note in the following code that if the synchronization condition is not satisfied, no operation is performed.

```
/******* Procedure: PositionSignal *******/
void PositionSignal()
{
    static RT_INTEGER iinfo[4] = {0,1,1,1};
    static RT_FLOAT rinfo[5] = {0.0,0.0,0.0,0.0,0.0};
    RT_INTEGER INIT = iinfo[1];
    /***** Local Block Outputs. *****/
    RT_INTEGER local_degree;
    RT_BOOLEAN condition;
    struct _UpdateDegree_u UpdateDegree_3_u;
    static struct _UpdateDegree_info UpdateDegree_3_i;
    /******* Initialization. *******/
    if( INIT ) {
        UpdateDegree_3_i.iinfo[0] = iinfo[0];
        UpdateDegree_3_i.iinfo[1] = iinfo[1];
        UpdateDegree_3_i.iinfo[3] = iinfo[3];
    }
    /***** Output Update. *****/
    /* --- Read from Variable */
    /* {Positionsignal.Read Degree.1} */
    Disable;
    local_degree = degree;
    Enable;
    /* --- Logical Expression */
    /* {PositionSignal.If Synchronized to Shaft.12} */
    condition = local_degree > -1;
    /* --- Condition Block */
    /* {Call UpdateDegree Procedure.3} */
    if( condition ) {
        /* --- Procedure Super Block */
        /* {UpdateDegree.3} */
        UpdateDegree_3_u.local degree = local_degree;
        UpdateDegree(&UpdateDegree_3_u,
            &UpdateDegree_3_i).
        iinfo[0] = UpdateDegree_3_i.iinfo[0];
        if( iinfo[0] != 0 ) {
            UpdateDegree_3_i.iinfo[0] = 0; goto
                EXEC_ERROR;
        }
        else {
        }
    INIT = 0;
    iinfo[1] = 0;
```

21
-continued

```
EXEC_ERROR: return;
}
```

The "UpdateDegree" procedure called from the "PositionSignal" procedure is shown with the following code, which corresponds to the functional description shown in FIG. 19. The code performs the operation of incrementing by one the "local_degree" variable if the variable is less than 359, otherwise the variable is assigned the value of zero. The "local_degree" variable is then passed to the global variable "degree".

```
/******* Procedure: UpdateDegree *******/
void UpdateDegree(U, I)
    struct _UpdateDegree_u *U;
    struct _UpdateDegree_info *I;
{
        RT_INTEGER *iinfo = &I->iinfo[0];
        RT_FLOAT *rinfo = &I->rinfo[0];
        /***** Local Block Outputs. *****/
        RT_INTEGER local_degree;
        /***** Output Update. *****/
        /* --- BlockScript Block */
        /* {UpdateDegree.Check For 360 Degree Wrap.23} */
        if (U->local_degree < 359) {
            local_degree = U->local_degree + 1;
        }
        else {
            local_degree = 0;
        }
        /* --- Write to Variable */
        /* {UpdateDegree.Update Degree.4} */
        Disable;
        degree = local_degree;
        Enable;
        iinfo[1] = 0;
EXEC_ERROR: return;
}
```

The final procedure is "ReferenceSignal" procedure superblock corresponding to the functional description shown in FIG. 20. The code illustrates the operation of calculating a new rpm value for the shaft of the real-time system 20. As in the previous procedures, local variables are used. For instance, the local variable "new_rpm", corresponding to the global variable "rpm", is calculated by dividing 60 into the local variable "count", which corresponds to the global variable "timer_value". The local variable "new_rpm" is then assigned to the global variable "rpm". The last lines of code in the procedure set the "timer_reset" global variable to "one", and set the "degree" global variable to 359.

```
/******* Procedure: ReferenceSignal *******/
void ReferenceSignal()
{
    static RT_INTEGER iinfo[4] = {0,1,1,1};
    static RT_FLOAT rinfo[5] = {0.0,0.0,0.0,0.0,0.0};
    /***** Local Block Outputs. *****/
    RT_INTEGER count;
    RT_INTEGER c359;
    RT_INTEGER one;
    RT_INTEGER new_rpm;
    /***** Output Update. *****/
    /* --- Read from Variable */
    /* {ReferenceSignal.Read Timer.13} */
    Disable;
    count = timer_value;
    Enable;
    /* --- Algebraic Expression */
    /* {ReferenceSignal.Constant Value.2} */
```

22
-continued

```
    c359 = 359;
    /* --- Algebraic Expression */
    /* {ReferenceSignal.Reset Mask.23} */
    one = 1;
    /* --- Algebraic Expression */
    /* {ReferenceSignal.Calculate RPM.12} */
    new_rpm = count/60;
    /* --- Write to Variable */
    /* {ReferenceSignal.Update RPM.5} */
    Disable;
    rpm = new_rpm;
    Enable;
    /* --- Write to Variable */
    /* {ReferenceSignal.Reset Timer.3} */
    Disable;
    timer_reset = one;
    Enable;
    /* --- Write to Variable */
    /* {ReferenceSignal.Update Degree.4} */
    Disable;
    degree = c359;
    Enable;
    iinfo[1] = 0;
EXEC_ERROR: return;
}
```

Returning now to FIG. 7, the software interface 132, functional library 136, and functional description 134 associated with the invention have now been fully disclosed. The control software 144 and asynchronous real-time controller 146 of the invention have also been fully disclosed. The code generator 138 of the invention has been also disclosed in relation to FIGS. 9 and 10. In view of the full disclosure of the other aspects of the invention, the code generator 138 may now 140 be fully described. The code generator 138 generally conforms with the code generator disclosed in the '179 patent. However, some modifications to the data structures of the apparatus of the '179 patent are required to accommodate the features of the present invention. Attention presently turns to the required data structure modifications.

Figure 21A:
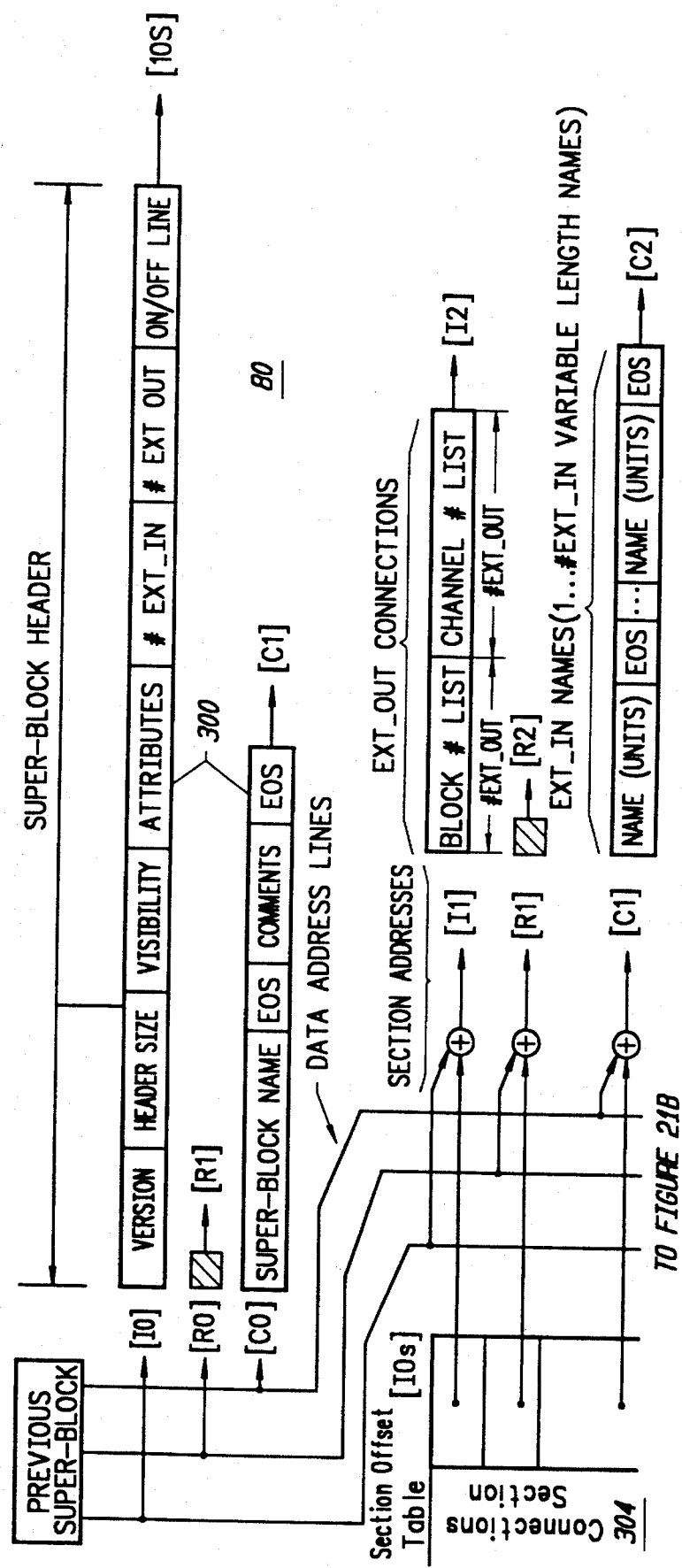
FIG. 21 is an example of a superblock data structure that may be used in accordance with the present invention.
Figure 21B:
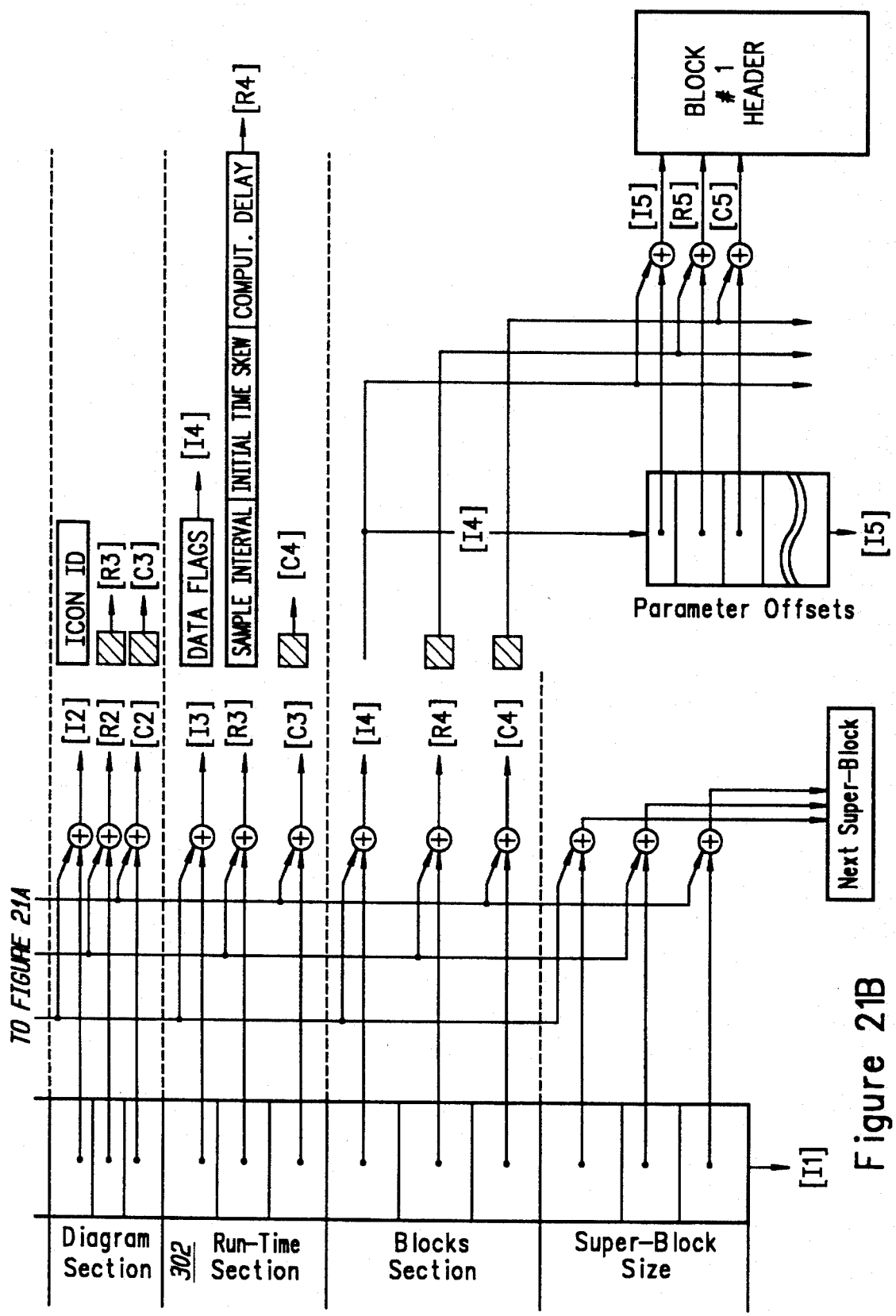

FIG. 21 illustrates the superblock data structure of the '179 patent that may also be used in accordance with the present invention when the following modifications are observed. The primary modification relates to the attributes field 300, which is modified to accommodate the new types of superblocks of the invention—the start-up, background, and interrupt superblock procedures. The new types of superblocks are identified with pre-assigned bit mask values. The run-time section 302 is also modified to include the name strings for any interrupt signals associated with the real-time system. For the example system described herein, the run-time section 302 is modified to accommodate the "sigpos" and "sigref" signals. Note that when the data structure of FIG. 21 is used with the procedural superblocks of the present invention there will be many empty fields. For instance, the #Ext_In and #Ext_Out fields will be empty since the procedural superblocks of the invention do not have input and output signals. For the same reason, the connection section 304 of the data structure will also be empty.

Figure 22A:
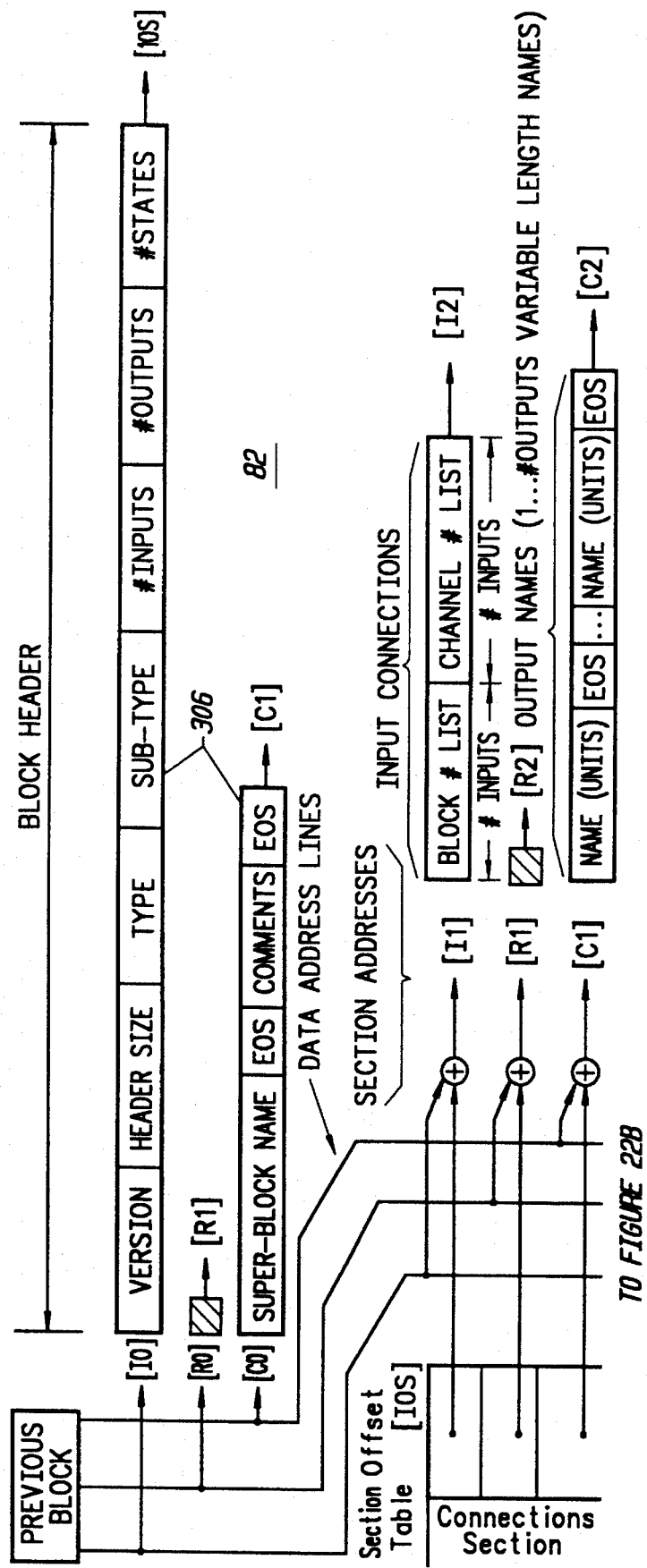
FIG. 22 is an example of a block data structure that may be used in accordance with the present invention.
Figure 22B:
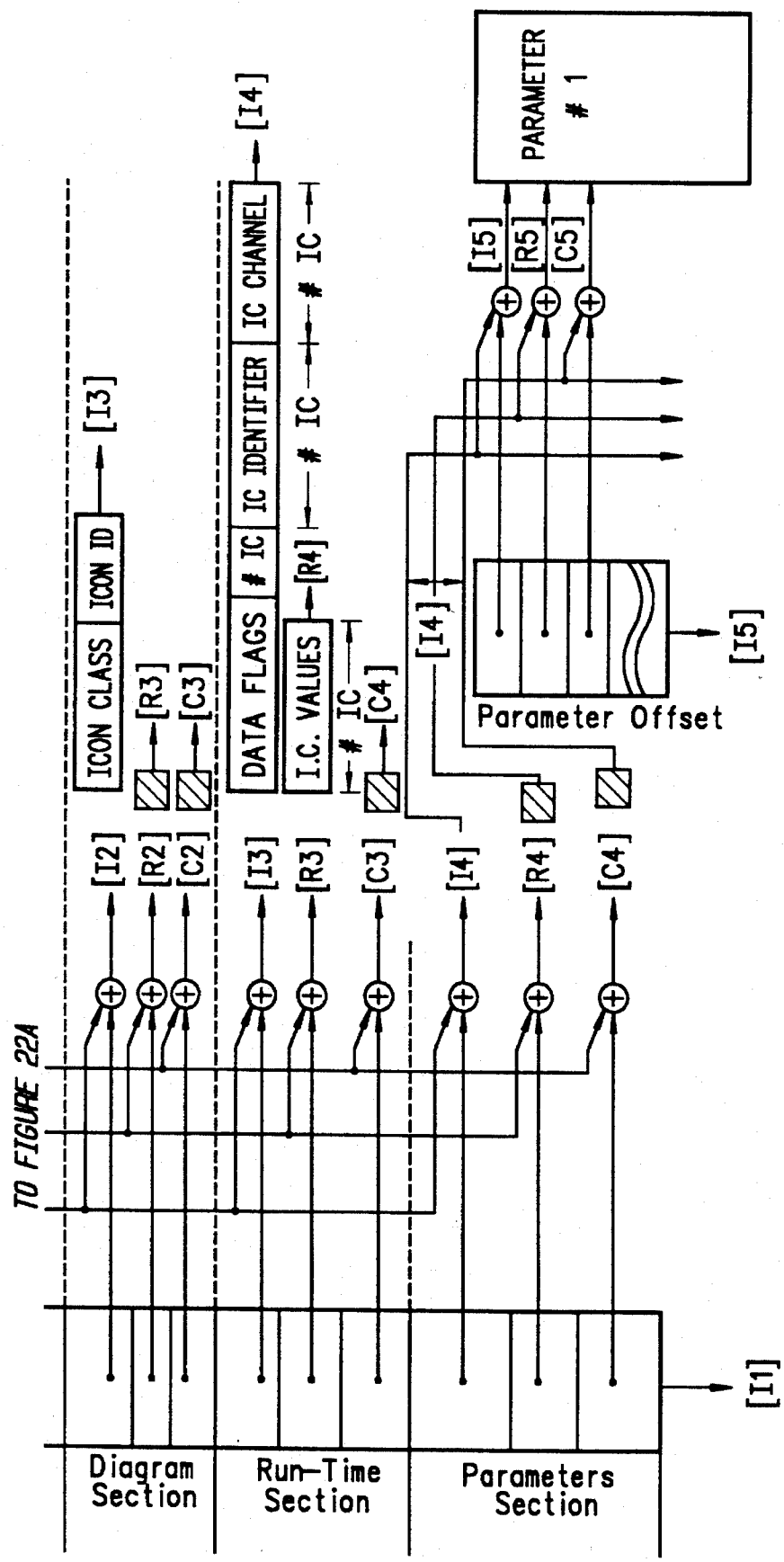

FIG. 22 illustrates a block function data structure used in the '179 patent that may also be used in accordance with the present invention. The block function data structure of the prior art must be modified in the following way. The type and sub-type fields 306 of the block function data structure point to entries in the functional block library, and thereby identify the computations associated with the block. Since the functional library 136 of the invention is supplemented to include read global variable blocks and write global variable blocks, the type and sub-type fields must be amended to include references to these types of data blocks.

Figure 23:
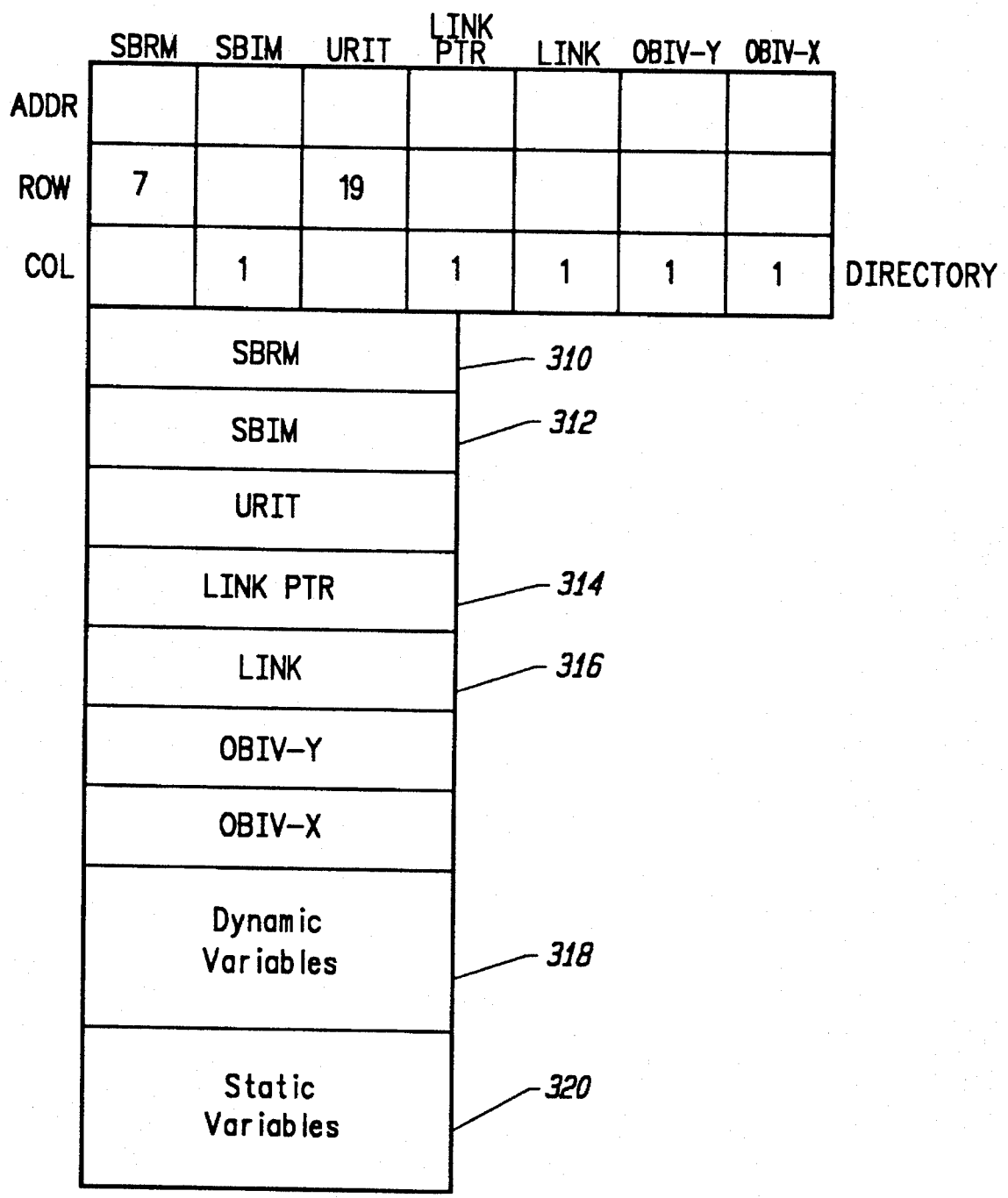
FIG. 23 illustrates a memory map that may be used for the link time data structures of the invention.

FIG. 23 illustrates the memory map for link time data structures associated with the '179 patent. The SBRM (superblock reference map) 310 is a memory map of the superblocks used in the control system. To accommodate the features of the present invention, this field must be modified to identify the start-up, background, and interrupt procedures of the invention. The SBIM (superblock index map) 312 provides pointers, indirectly through the LINK PTR data structure 314, to the LINK data structure 316, which contains information regarding how the blocks within each subsystem are linked to one another. These pointers are modified to identify connections for control functions called from the procedure superblocks of the invention. For instance, the linking of blocks in the control function of FIG. 16 would be described with the SBIM field. The memory map is also modified to accommodate dynamic variables 318 corresponding to the variable blocks of the invention and to accommodate static variables 320 of the invention, such as the constant value of block 236 in FIG. 20.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A code generation system to construct an asynchronous real-time controller for a real-time system with asynchronous subsystems, comprising:
    a software user interface to specify a functional description of a real-time system with asynchronous subsystems, said software user interface including code construction elements selected from a functional library with a corresponding menu including
        a start-up procedure selection option used to initialize a plurality of parameters associated with said real-time system,
        a background procedure selection option to specify a control action to be executed in relation to said real-time system, and
        an interrupt procedure selection option to specify an operation to be performed in response to an asynchronous interrupt signal, said startup procedure selection option, said background procedure selection option, and said interrupt procedure selection option each including a definition tool to read and write values to global variables; and
    an automatic code generator responsive to said code construction elements to generate an asynchronous real-time controller with
        a start-up procedure that initializes a plurality of parameters associated with said real-time system,
        an interrupt procedure that specifies an operation to be performed in response to an asynchronous interrupt signal from said real-time system, and
        a background procedure that continuously loops through a set of instructions and periodically generates a control action instruction, derived from said interrupt procedure, to be executed by said real-time system, wherein said automatic code generator generates said asynchronous real-time controller such that said start-up procedure, said interrupt procedure, and said background procedure operate without being scheduled by a scheduler.

2. The code generation system of claim 1 wherein said start-up procedure selection option, said background procedure selection option, and said interrupt procedure selection option are each selected through said software user interface without identifying external inputs or outputs.

3. The code generation system of claim 1 wherein said automatic code generator generates said interrupt procedure such that said interrupt signal enables a read from or a write to said global variables.

4. The code generation system of claim 3 wherein said automatic code generator generates said interrupt procedure such that said interrupt signal associates a write to a global variable with a disable command that precludes any other interrupts during said disable command.

5. A method of constructing an asynchronous real-time controller for a real-time system with asynchronous subsystems, comprising the steps of:
    specifying a functional description of a real-time system with asynchronous subsystems through a software user interface including code construction elements selected from a functional library with a corresponding menu including:
        a start-up procedure selection option used to initialize a plurality of parameters associated with said real-time system,
        a background procedure selection option to specify a control action to be executed in relation to said real-time system, and
        an interrupt procedure selection option to specify an operation to be performed in response to an asynchronous interrupt signal, said start-up procedure selection option, said background procedure selection option, and said interrupt procedure selection option each including a definition tool to read and write values to global variables; and
    responding to said code construction elements to generate an asynchronous real-time controller with
        a start-up procedure that initializes a plurality of parameters associated with said real-time system,
        an interrupt procedure that specifies an operation to be performed in response to an asynchronous interrupt signal from said real-time system, and
        a background procedure that continuously loops through a set of instructions and periodically generates a control action instruction, derived from said interrupt procedure, to be executed by said real-time system, wherein said responding step includes the step of generating said asynchronous real-time controller such that said start-up procedure, said interrupt procedure, and said background procedure operate without being scheduled by a scheduler.

6. The method of claim 5 wherein said specifying step includes the step of selecting said start-up procedure selection option, said background procedure selection option, and said interrupt procedure selection option without identifying external inputs or outputs.

7. The method of claim 5 wherein said responding step includes the step of generating said interrupt procedure such that said interrupt signal enables a read from or a write to said global variables.

8. The method of claim 5 wherein said responding step includes the step of generating said interrupt procedure such that said interrupt signal associates a write to a global variable with a disable command that precludes any other interrupts during said disable command.

9. A code generation system to construct an asynchronous real-time controller for a real-time system with asynchronous subsystems, comprising:

a software user interface to specify a functional description of a real-time system with asynchronous subsystems, said software user interface including code construction elements selected from a functional library with a corresponding menu including a start-up procedure selection option used to initialize a plurality of parameters associated with said real-time system, a background procedure selection option to specify a control action to be executed in relation to said real-time system, and an interrupt procedure selection option to specify an operation to be performed in response to an asynchronous interrupt signal, said startup procedure selection option, said background procedure selection option, and said interrupt procedure selection option each including a definition tool to read and write values to global variables; and an automatic code generator responsive to said code construction elements to generate an asynchronous real-time controller with a start-up procedure that initializes a plurality of parameters associated with said real-time system, an interrupt procedure to process a synchronous interrupt signal from said real-time system in a time-scheduled manner and said asynchronous interrupt signal from said real-time system in an un-scheduled asynchronous manner, and a background procedure that continuously loops through a set of instructions and immediately invokes an asynchronous interrupt service routine in response to said asynchronous interrupt signal from said real-time system.

10. The code generation system of claim 9 wherein said start-up procedure selection option, said background procedure selection option, and said interrupt procedure selection option are each selected through said software user interface without identifying external inputs or outputs.

11. The code generation system of claim 9 wherein said automatic code generator generates said interrupt procedure such that said interrupt signal enables a read from or a write to said global variables.

12. The code generation system of claim 9 wherein said automatic code generator generates said interrupt procedure such that said interrupt signal associates a write to a global variable command that precludes any other interrupts during said disable command.

* * * * *